(12) United States Patent
Rivera

(10) Patent No.: US 12,342,955 B2
(45) Date of Patent: *Jul. 1, 2025

(54) BREWING MATERIAL CONTAINER FOR A BEVERAGE BREWER

(71) Applicant: Adrian Rivera Maynez Enterprises, Inc., Whittier, CA (US)

(72) Inventor: Adrian Rivera, Whittier, CA (US)

(73) Assignee: Adrian Rivera Maynez Enterprises, Inc., La Mirada, CA (US)

( * ) Notice: Subject to any disclaimer, the term of this patent is extended or adjusted under 35 U.S.C. 154(b) by 819 days.

This patent is subject to a terminal disclaimer.

(21) Appl. No.: 17/514,451

(22) Filed: Oct. 29, 2021

(65) Prior Publication Data

US 2022/0142392 A1 May 12, 2022

Related U.S. Application Data

(63) Continuation-in-part of application No. 17/084,827, filed on Oct. 30, 2020, now Pat. No. 11,832,755.

(60) Provisional application No. 63/190,184, filed on May 18, 2021, provisional application No. 63/154,868, filed on Mar. 1, 2021, provisional application No.
(Continued)

(51) Int. Cl.
*A47J 31/06* (2006.01)

(52) U.S. Cl.
CPC .................. *A47J 31/0689* (2013.01)

(58) Field of Classification Search
CPC .................................... A47J 31/0689
USPC .......................................... 99/323
See application file for complete search history.

(56) References Cited

U.S. PATENT DOCUMENTS

| 1,377,316 A | 5/1921 | Clermont |
| 2,234,397 A | 3/1941 | Bentz |
| 2,242,684 A | 5/1941 | Stuart |

(Continued)

FOREIGN PATENT DOCUMENTS

| CN | 2615077 Y | 5/2004 |
| DE | 102011012860 A1 | 12/2012 |

(Continued)

OTHER PUBLICATIONS

Keurig® My K-Cup® Reusable Coffee Filter, https://www.keurig.com/My-K-Cup%C2%AE-Reusable-Coffee-Filter/p/My-K-Cup-Universal-Reusable-Coffee-Filter# (Year: 2024).*

(Continued)

*Primary Examiner* — Jimmy Chou
(74) *Attorney, Agent, or Firm* — IP Strategies

(57) ABSTRACT

A brewing material container for a beverage brewer includes a receptacle, a lid, and a selective obstruction. The receptacle is configured to receive and hold beverage brewing material and to be placed in a brewing chamber of the beverage brewer, and includes a base, and a sidewall extending from the base and terminating in an open end. The lid is configured to engage with the open end of the sidewall to cover the open end at least partially, and includes a plurality of lid openings configured to receive a corresponding respective plurality of injection nozzles of the beverage brewer. The receptacle base and/or the receptacle sidewall includes a receptacle opening configured to allow fluid flow from an interior of the receptacle to an exterior of the receptacle. The selective obstruction is configured to selectively block one or more of the lid openings.

28 Claims, 39 Drawing Sheets

Related U.S. Application Data

63/116,096, filed on Nov. 19, 2020, provisional application No. 63/113,721, filed on Nov. 13, 2020.

(56) References Cited

U.S. PATENT DOCUMENTS

| | | |
|---|---|---|
| 2,407,118 A | 9/1946 | Waters |
| 2,433,815 A | 12/1947 | Laforge |
| 2,443,520 A | 6/1948 | Schwartz et al. |
| 2,546,874 A | 3/1951 | Siegrist |
| 3,022,411 A | 2/1962 | Soper et al. |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenberg et al. |
| 3,336,857 A | 8/1967 | Knodt et al. |
| 3,384,004 A | 5/1968 | Perlman et al. |
| 3,403,617 A | 10/1968 | Lampe |
| 3,405,630 A | 10/1968 | Weber, III |
| 3,583,308 A | 6/1971 | Williams |
| 3,592,126 A | 7/1971 | Dombrowik |
| 3,607,297 A | 9/1971 | Fasano |
| 3,695,168 A | 10/1972 | Van Brunt |
| 3,713,377 A | 1/1973 | Arnett et al. |
| 3,757,670 A | 9/1973 | Laama et al. |
| 3,844,206 A | 10/1974 | Weber |
| 3,948,157 A | 4/1976 | Layre |
| 3,958,502 A | 5/1976 | Vitous |
| 4,052,318 A | 10/1977 | Krebs |
| 4,086,848 A | 5/1978 | Hahn |
| 4,143,590 A | 3/1979 | Kasakoff |
| 4,152,464 A | 5/1979 | Brody et al. |
| 4,164,644 A | 8/1979 | Remsnyder et al. |
| D255,313 S | 6/1980 | Elkerbout |
| 4,221,670 A | 9/1980 | Ziemek |
| 4,253,385 A | 3/1981 | Illy |
| 4,286,515 A | 9/1981 | Baumann et al. |
| 4,510,853 A | 4/1985 | Takagi |
| 4,550,024 A | 10/1985 | le Granse |
| 4,603,621 A | 8/1986 | Roberts |
| 4,653,390 A | 3/1987 | Hayes |
| 4,656,932 A | 4/1987 | Kopp |
| 4,676,396 A | 6/1987 | Mamolou |
| 4,703,687 A | 11/1987 | Wei |
| 4,704,954 A | 11/1987 | Mollenhoff |
| 4,706,555 A | 11/1987 | Nakamura et al. |
| 4,721,835 A | 1/1988 | Welker |
| 4,735,719 A | 4/1988 | Benedict |
| 4,739,697 A | 4/1988 | Roberts |
| 4,800,089 A | 1/1989 | Scott |
| 4,832,845 A | 5/1989 | Hendretti |
| 4,833,979 A | 5/1989 | Garulli et al. |
| 4,836,592 A | 6/1989 | Roberts |
| 4,848,815 A | 7/1989 | Molloy |
| 4,858,523 A | 8/1989 | Helbling |
| 4,865,737 A | 9/1989 | McMichael |
| 4,882,982 A | 11/1989 | Muttoni |
| 4,957,217 A | 9/1990 | Ritson |
| 4,967,648 A | 11/1990 | Helbling |
| 4,986,172 A | 1/1991 | Hunnicutt, Jr. |
| 4,995,310 A | 2/1991 | van der Lijn et al. |
| 4,998,463 A | 3/1991 | Precht et al. |
| 5,000,082 A | 3/1991 | Lassota |
| 5,012,059 A | 4/1991 | Boatman |
| 5,012,629 A | 5/1991 | Rehman et al. |
| 5,028,328 A | 7/1991 | Long |
| 5,046,409 A | 9/1991 | Henn |
| 5,072,660 A | 12/1991 | Helbling |
| 5,097,984 A | 3/1992 | Meisner et al. |
| 5,120,439 A | 6/1992 | McFarlin |
| 5,123,335 A | 6/1992 | Aselu |
| 5,171,457 A | 12/1992 | Acuff et al. |
| 5,190,653 A | 3/1993 | Herrick et al. |
| 5,197,374 A | 3/1993 | Fond |
| 5,233,914 A | 8/1993 | English |
| 5,242,702 A | 9/1993 | Fond |
| 5,265,517 A | 11/1993 | Gilbert |
| 5,287,797 A | 2/1994 | Grykiewicz et al. |
| 5,298,267 A | 3/1994 | Gruenbacher |
| 5,325,765 A | 7/1994 | Sylvan et al. |
| 5,335,589 A | 8/1994 | Yerves, Jr. et al. |
| 5,343,799 A | 9/1994 | Fond |
| 5,347,916 A | 9/1994 | Fond et al. |
| 5,363,745 A | 11/1994 | Lin |
| 5,398,596 A | 3/1995 | Fond |
| 5,401,328 A | 3/1995 | Schmitz |
| 5,403,605 A | 4/1995 | Smith et al. |
| 5,406,882 A | 4/1995 | Shaanan |
| 5,463,932 A | 11/1995 | Olson |
| 5,490,448 A | 2/1996 | Weller et al. |
| 5,526,733 A | 6/1996 | Klawuhn et al. |
| 5,531,152 A | 7/1996 | Gardosi |
| 5,562,941 A | 10/1996 | Levy |
| 5,582,730 A | 12/1996 | Hugentobler |
| 5,582,731 A | 12/1996 | Gianfranco |
| 5,635,233 A | 6/1997 | Levinson |
| 5,636,563 A | 6/1997 | Oppermann et al. |
| 5,649,412 A | 7/1997 | Binacchi |
| 5,669,287 A | 9/1997 | Jefferson, Jr. et al. |
| 5,676,041 A | 10/1997 | Glucksman et al. |
| 5,775,206 A | 7/1998 | St-Gelais |
| 5,829,340 A | 11/1998 | Yang |
| 5,840,189 A | 11/1998 | Sylvan et al. |
| 5,865,094 A | 2/1999 | Kealy |
| 5,870,943 A | 2/1999 | Levi et al. |
| 5,887,510 A | 3/1999 | Porter |
| D407,602 S | 4/1999 | Patel |
| 5,895,672 A | 4/1999 | Cooper |
| 5,897,899 A | 4/1999 | Fond |
| 5,910,205 A | 6/1999 | Patel |
| 5,913,964 A | 6/1999 | Melton |
| 5,924,563 A | 7/1999 | Salyers |
| 5,931,329 A | 8/1999 | Wu |
| 5,932,260 A | 8/1999 | Soughan |
| 6,065,609 A | 5/2000 | Lake |
| 6,079,315 A | 6/2000 | Beaulieu et al. |
| D431,423 S | 10/2000 | Ohm et al. |
| 6,136,352 A | 10/2000 | Silverstein et al. |
| 6,138,551 A | 10/2000 | Bauer et al. |
| 6,189,438 B1 | 2/2001 | Bielfeldt et al. |
| 6,202,542 B1 | 3/2001 | Melton |
| RE37,173 E | 5/2001 | Jefferson, Jr. et al. |
| 6,227,102 B1 | 5/2001 | Sham et al. |
| 6,231,909 B1 | 5/2001 | Levinson |
| 6,250,209 B1 | 6/2001 | Pope |
| 6,253,662 B1 | 7/2001 | Zelson |
| 6,263,781 B1 | 7/2001 | Calagui |
| 6,273,293 B1 | 8/2001 | Carlson |
| D454,433 S | 3/2002 | Peter |
| 6,440,256 B1 | 8/2002 | Gordon et al. |
| 6,499,388 B2 | 12/2002 | Schmed |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,662,955 B1 | 12/2003 | Lassota |
| 6,688,490 B2 | 2/2004 | Carlson |
| 6,708,600 B2 | 3/2004 | Winkler et al. |
| 6,727,484 B2 | 4/2004 | Policappelli |
| 6,740,345 B2 | 5/2004 | Cai |
| 6,758,130 B2 | 7/2004 | Sargent et al. |
| 6,777,007 B2 | 8/2004 | Cai |
| 6,786,136 B2 | 9/2004 | Cirigliano et al. |
| 6,832,542 B2 | 12/2004 | Hu et al. |
| 6,843,165 B2 | 1/2005 | Stoner |
| D502,362 S | 3/2005 | Lazaris et al. |
| 6,904,840 B1 | 6/2005 | Pfeifer et al. |
| 6,948,420 B2 | 9/2005 | Kirschner et al. |
| 6,968,775 B2 | 11/2005 | Burrows et al. |

(56) References Cited

U.S. PATENT DOCUMENTS

| | | |
|---|---|---|
| 7,047,870 B2 | 5/2006 | Gantt et al. |
| 7,081,263 B2 | 7/2006 | Albrecht |
| 7,131,369 B2 | 11/2006 | Gantt et al. |
| 7,165,488 B2 | 1/2007 | Bragg et al. |
| 7,318,374 B2 | 1/2008 | Guerrero |
| 7,320,274 B2 | 1/2008 | Castellani |
| D567,021 S | 4/2008 | Bach et al. |
| 7,377,089 B2 | 5/2008 | Rapparini |
| 7,461,587 B2 | 12/2008 | Guerrero |
| 7,730,829 B2 | 7/2010 | Hammad |
| 7,836,819 B2 | 11/2010 | Suggi Liverani et al. |
| 7,946,217 B2 | 5/2011 | Favre et al. |
| 8,047,127 B2 | 11/2011 | Lin |
| 8,087,347 B2 | 1/2012 | Halliday et al. |
| 8,221,813 B2 | 7/2012 | Boul |
| 8,327,754 B2 | 12/2012 | Kirschner et al. |
| D688,095 S | 8/2013 | DeMiglio et al. |
| 8,561,524 B2* | 10/2013 | DeMiglio ............ A47J 31/0689 99/305 |
| D694,579 S | 12/2013 | Khubani |
| 8,707,855 B2* | 4/2014 | DeMiglio ............ A47J 31/0689 99/279 |
| 8,720,320 B1 | 5/2014 | Rivera |
| 9,023,412 B2 | 5/2015 | Doleac et al. |
| 9,149,149 B2 | 10/2015 | Oh |
| 9,232,871 B2 | 1/2016 | Rivera |
| 9,232,872 B2 | 1/2016 | Rivera |
| 9,271,597 B2 | 3/2016 | Rivera |
| 9,402,501 B1 | 8/2016 | Vu |
| 9,795,243 B2 | 10/2017 | Rivera |
| 9,844,292 B2 | 12/2017 | Rivera |
| 9,907,425 B2 | 3/2018 | Rivera |
| 10,336,531 B2 | 7/2019 | Trombetta et al. |
| 10,450,130 B2 | 10/2019 | Hansen |
| 10,450,131 B2 | 10/2019 | Norton et al. |
| 2001/0043954 A1 | 11/2001 | Sweet |
| 2002/0005367 A1 | 1/2002 | Zelson |
| 2002/0023543 A1 | 2/2002 | Schmed |
| 2002/0035929 A1 | 3/2002 | Kanba et al. |
| 2002/0048621 A1 | 4/2002 | Boyd et al. |
| 2002/0059870 A1 | 5/2002 | Walters, Jr. et al. |
| 2002/0078831 A1 | 6/2002 | Cai |
| 2002/0144604 A1 | 10/2002 | Winkler et al. |
| 2002/0148356 A1 | 10/2002 | Lazaris et al. |
| 2002/0148358 A1 | 10/2002 | Sweeney et al. |
| 2003/0006185 A1 | 1/2003 | Hepler |
| 2003/0041739 A1 | 3/2003 | Cai |
| 2003/0167928 A1 | 9/2003 | Mulle et al. |
| 2003/0200872 A1 | 10/2003 | Lin |
| 2003/0213370 A1 | 11/2003 | Hammad et al. |
| 2003/0222089 A1 | 12/2003 | Hale |
| 2003/0226449 A1 | 12/2003 | Carasso et al. |
| 2004/0005384 A1 | 1/2004 | Cai |
| 2004/0020368 A1 | 2/2004 | Cai |
| 2004/0020922 A1 | 2/2004 | Alves |
| 2004/0045443 A1 | 3/2004 | Azaris et al. |
| 2004/0118290 A1 | 6/2004 | Cai |
| 2004/0182247 A1 | 9/2004 | Guerrero |
| 2004/0244600 A1 | 12/2004 | Lalanne-Eygun |
| 2005/0051478 A1 | 3/2005 | Karanikos et al. |
| 2005/0160918 A1 | 7/2005 | Winstanley et al. |
| 2005/0172819 A1 | 8/2005 | Chen et al. |
| 2005/0223904 A1 | 10/2005 | Laigneau et al. |
| 2005/0236323 A1 | 10/2005 | Oliver et al. |
| 2005/0257695 A1 | 11/2005 | Dobranski et al. |
| 2005/0266122 A1 | 12/2005 | Franceschi |
| 2005/0284303 A1 | 12/2005 | Zell et al. |
| 2006/0019000 A1 | 1/2006 | Zanetti |
| 2006/0107841 A1 | 5/2006 | Schifferle |
| 2006/0159815 A1 | 7/2006 | Crook et al. |
| 2006/0174769 A1 | 8/2006 | Favre et al. |
| 2006/0196364 A1 | 9/2006 | Kirschner |
| 2006/0230944 A1 | 10/2006 | Neace et al. |
| 2006/0236871 A1 | 10/2006 | Ternite et al. |
| 2006/0254428 A1 | 11/2006 | Glucksman et al. |
| 2007/0148290 A1 | 6/2007 | Ternite et al. |
| 2007/0151460 A1 | 7/2007 | Beck |
| 2007/0175334 A1 | 8/2007 | Halliday et al. |
| 2007/0186784 A1 | 8/2007 | Liverani et al. |
| 2007/0277677 A1 | 12/2007 | Roberg |
| 2009/0229470 A1 | 9/2009 | Dorfmueller |
| 2009/0229471 A1 | 9/2009 | Lun et al. |
| 2010/0047419 A1 | 2/2010 | Boul |
| 2010/0083843 A1 | 4/2010 | Denisart et al. |
| 2010/0288131 A1 | 11/2010 | Kilber et al. |
| 2010/0303964 A1 | 12/2010 | Beaulieu et al. |
| 2011/0073607 A1 | 3/2011 | Fu et al. |
| 2011/0209623 A1 | 9/2011 | Leung et al. |
| 2011/0274802 A1 | 11/2011 | Rivera |
| 2012/0058226 A1 | 3/2012 | Winkler et al. |
| 2012/0097602 A1 | 4/2012 | Tedford |
| 2012/0118880 A1 | 5/2012 | Wnek |
| 2012/0148709 A1 | 6/2012 | Kamerbeek et al. |
| 2012/0207895 A1 | 8/2012 | Rivera |
| 2012/0207896 A1 | 8/2012 | Rivera |
| 2012/0258210 A1 | 10/2012 | Wong et al. |
| 2012/0276264 A1 | 11/2012 | Rivera |
| 2012/0285330 A1 | 11/2012 | Demiglio et al. |
| 2012/0285334 A1 | 11/2012 | Demiglio et al. |
| 2012/0308688 A1 | 12/2012 | Peterson et al. |
| 2012/0321748 A1 | 12/2012 | Otto et al. |
| 2012/0328739 A1 | 12/2012 | Nocera |
| 2013/0017303 A1 | 1/2013 | Vu |
| 2013/0025466 A1 | 1/2013 | Fu et al. |
| 2013/0055903 A1 | 3/2013 | Deuber |
| 2013/0095212 A1 | 4/2013 | Beer |
| 2013/0156897 A1 | 6/2013 | Goldstein |
| 2014/0004231 A1 | 1/2014 | Norton et al. |
| 2014/0008368 A1 | 1/2014 | Severini |
| 2014/0124435 A1 | 5/2014 | Jackson |
| 2014/0141128 A1 | 5/2014 | Trombetta et al. |
| 2014/0245895 A1 | 9/2014 | Demiglio et al. |
| 2014/0287105 A1 | 9/2014 | Husband et al. |
| 2015/0050391 A1 | 2/2015 | Rapparini |
| 2015/0068404 A1* | 3/2015 | Rivera ................ A47J 31/4492 99/323 |
| 2015/0173555 A1 | 6/2015 | Sumiyoshi et al. |
| 2015/0175347 A1 | 6/2015 | Empl |
| 2016/0016727 A1 | 1/2016 | Katz |
| 2016/0029833 A1 | 2/2016 | Lin |
| 2016/0068336 A1 | 3/2016 | Biesheuvel et al. |
| 2016/0137402 A1* | 5/2016 | Talon .................... A47J 31/407 426/115 |
| 2016/0157660 A1 | 6/2016 | Rivera |
| 2016/0206133 A1 | 7/2016 | Rivera |
| 2016/0311608 A1 | 10/2016 | Accursi |
| 2017/0158422 A1 | 6/2017 | Andreae et al. |
| 2017/0258260 A1 | 9/2017 | Hsu |
| 2018/0116444 A1 | 5/2018 | Rivera |
| 2021/0127889 A1* | 5/2021 | Sasena ................ A47J 31/0689 |

FOREIGN PATENT DOCUMENTS

| | | |
|---|---|---|
| EP | 1183195 A1 | 3/2002 |
| EP | 1364605 B1 | 11/2005 |
| EP | 1837294 B1 | 7/2008 |
| EP | 2580145 B1 | 5/2015 |
| KR | 100535744 B1 | 1/2006 |
| NZ | 248659 A | 12/1994 |
| WO | 2005/092160 A1 | 10/2005 |
| WO | 2008125256 A1 | 10/2008 |

OTHER PUBLICATIONS

My-Kap lid for K-Cup, https://www.amazon.com/My-Kap-Kaps-K-Cups-Brush-2-45-Ounce/dp/B007614OGK/ref=cm_cr_arp_d_product_top?ie=UTF8 (Year: 2012).*

Perfect Pod EZ-Cup, https://www.perfectpod.com/products/ez-cup-2 (Year: 2016).*

Keurig® My K-Cup® Reusable Coffee Filter, https://www.keurig.com/My-K-Cup%C2%AE-Reusable-Coffee-Filter/p/My-K-Cup-Universal-Reusable-Coffee-Filter#.

(56) References Cited

OTHER PUBLICATIONS

My-Kap lid for K-Cup, https://www.amazon.com/My-Kap-Kaps-K-Cups-Brush-2-45-Ounce/dp/B007614OGK/ref=cm_cr_arp_d_product_top?ie=UTF8.
Perfect Pod EZ-Cup, https://www.perfectpod.com/products/ez-cup-2.

* cited by examiner

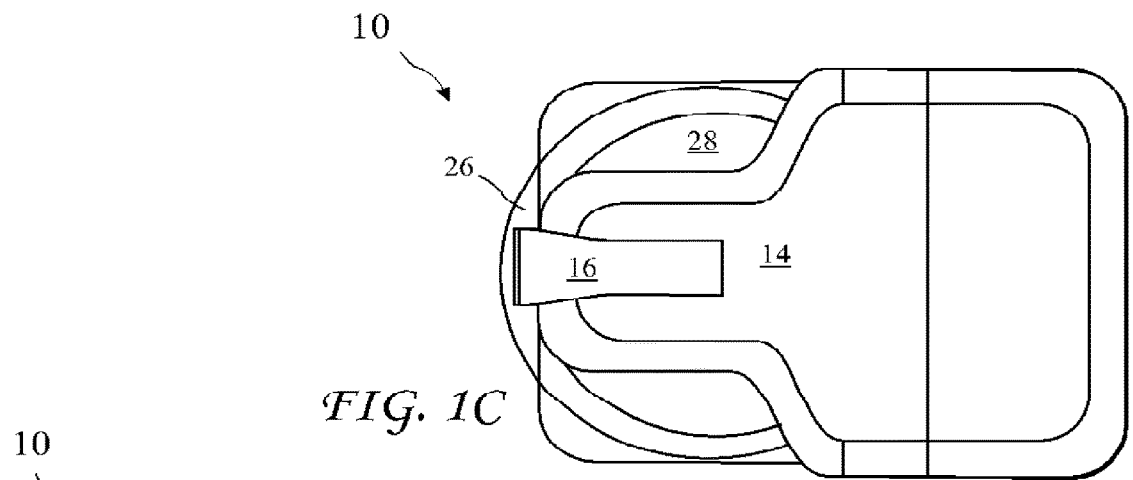
FIG. 1C
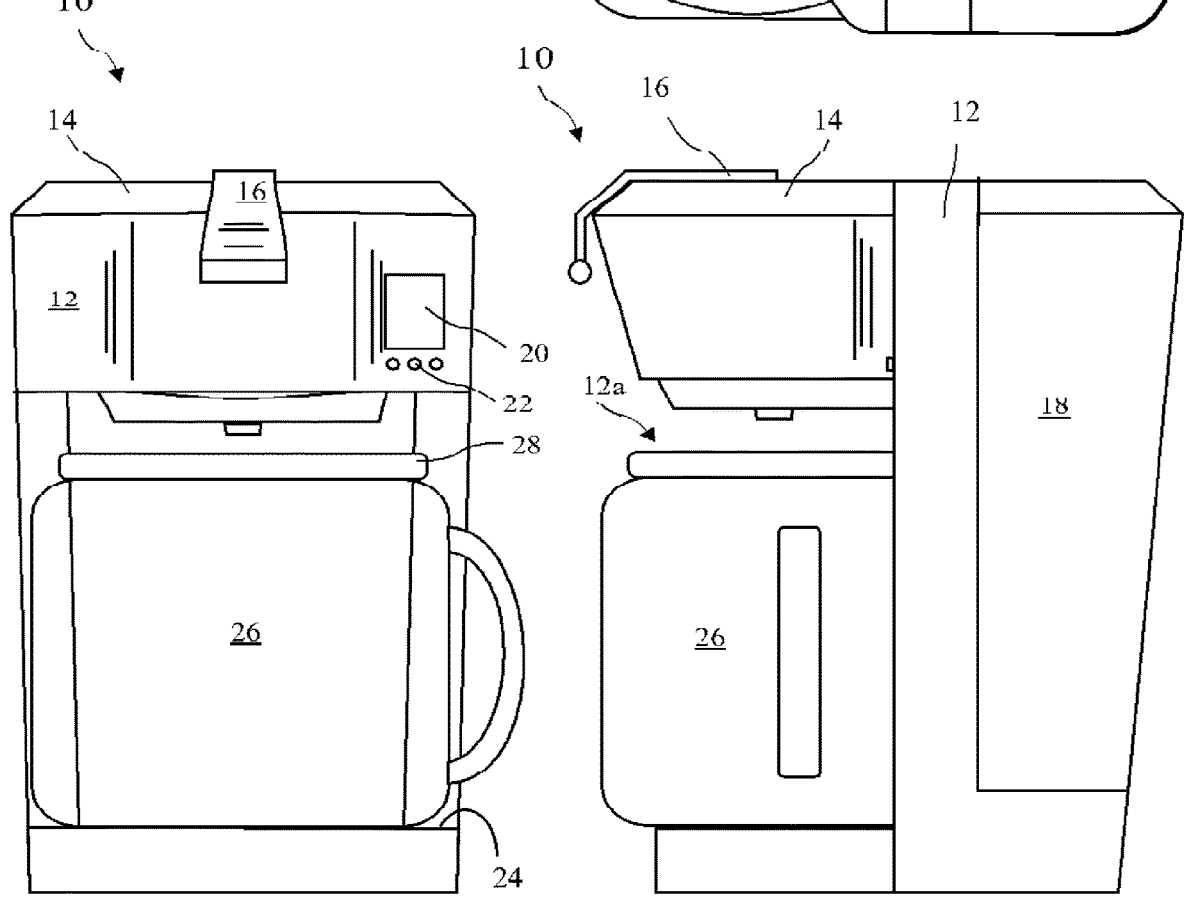
FIG. 1A
FIG. 1B

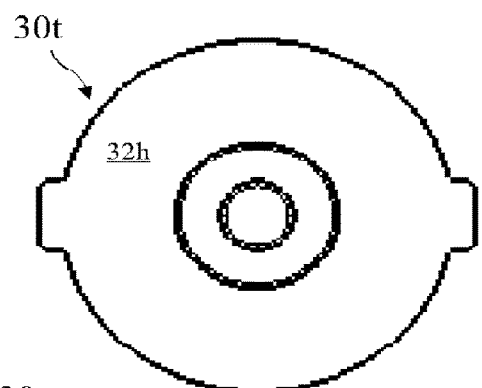
FIG. 15C
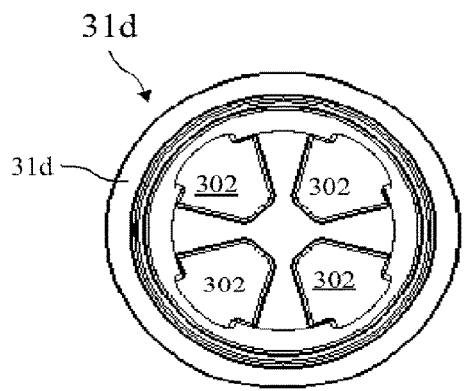
FIG. 16A
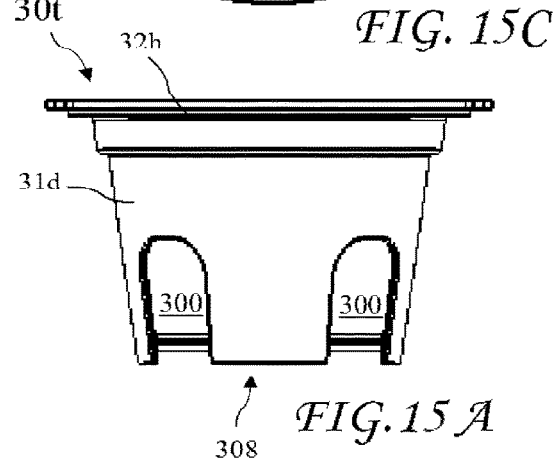
FIG. 15A
FIG. 15B
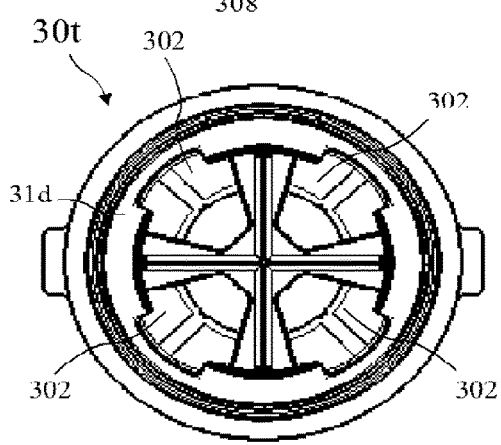
FIG. 15D
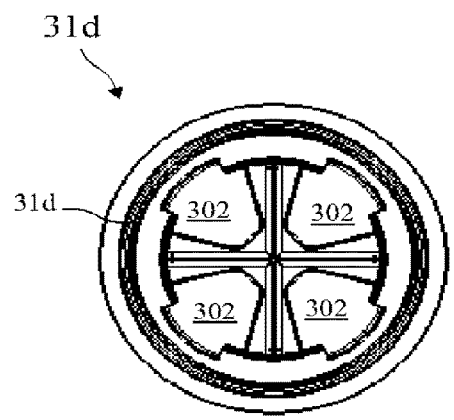
FIG. 16B

BREWING MATERIAL CONTAINER FOR A BEVERAGE BREWER

CROSS-REFERENCE TO RELATED APPLICATIONS

This is a continuation-in-part of U.S. patent application Ser. No. 17/084,827, which was filed on Oct. 30, 2020, and which claims priority from U.S. Provisional Application for Patent No. 63/094,867, filed on Oct. 21, 2020; which in turn was a continuation-in-part of U.S. patent application Ser. No. 15/855,776, which was filed on Dec. 27, 2017; which in turn was a continuation-in-part of U.S. patent application Ser. No. 15/790,398, which was filed on Oct. 23, 2017, and a continuation-in-part of U.S. patent application Ser. No. 12/960,496, which was filed on Dec. 4, 2010; which in turn is a continuation-in-part of U.S. patent application Ser. No. 11/777,831, which was filed on Jul. 13, 2007, the disclosures of which are incorporated herein in their entireties. This is also related to U.S. patent application Ser. No. 14/276,919, which was filed on May 13, 2014 and issued on Sep. 12, 2017 as U.S. Pat. No. 9,756,974; U.S. patent application Ser. No. 13/436,667, which was filed on Mar. 30, 2012 and issued on Mar. 1, 2016 as U.S. Pat. No. 9,271,597; U.S. patent application Ser. No. 13/436,690, which was filed on Mar. 30, 2012 and issued on Jan. 12, 2016 as U.S. Pat. No. 9,232,871; U.S. patent application Ser. No. 13/546,875, which was filed on Jul. 11, 2012 and issued on Jan. 12, 2016 as U.S. Pat. No. 9,232,872; the disclosures of which are incorporated herein in their entireties. This is also related to, and claims priority from, U.S. Provisional Application for Patent No. 63/113,721, filed on Nov. 13, 2020; U.S. Provisional Application for Patent No. 63/116,096, filed on Nov. 19, 2020; U.S. Provisional Application for Patent No. 63/154,868, filed on Mar. 1, 2021; and U.S. Provisional Application for Patent No. 63/190,184, filed on May 18, 2021; the disclosures of which are incorporated herein in their entireties.

FIELD OF THE INVENTION

This invention generally relates to accessories for beverage brewers, and more particularly, relates to an adapter assembly configured to provide operative compatibility between a beverage brewer and a beverage brewing material.

BACKGROUND OF THE INVENTION

Various types of beverage brewers, including single-serve beverage brewers, have been developed and are popular for home brewing of coffee and other beverages. These machines are generally designed with brewing chambers adapted to receive a small packet, pod, or cartridge of ground coffee or other beverage brewing material. After the beverage packet is placed in the brewing chamber, the machine injects hot water into the packet to produce a quantity, often a single serving, of freshly brewed beverage. Some machines have brewing chambers configured to receive pods that are small, flattened disk-shaped filter packages of beverage material, while other machines are configured to accommodate larger, cup-like beverage filter cartridges, or cartridges having other configurations.

One particular type of beverage brewer designed to accommodate a beverage filter cartridge is manufactured and sold by Keurig Inc. of Wakefield, MA The machine has a brewing chamber dimensioned to receive cartridges such as those sold under the brand K-Cup®. These cartridges are configured in the form of a container having a permeable filter packet containing a dry beverage medium such as ground coffee beans, which is disposed in the interior of the container. The machine also has upper and lower puncture needles. In operation, the upper needle punctures the top lid of the cartridge and injects pressurized water through the opening onto the beverage medium while the lower needle punctures the bottom of the cartridge to create an outlet for outflow of the brewed beverage. A recent model, the K-Supreme, has multiple upper injection needles or nozzles to provide hot water to the brewing material.

The configuration of the brewing chamber of the above-described beverage brewer inherently limits the use of the machine to disposable cartridges. Use of these machines results in waste in the form of a disposed cartridge for each brewed beverage. The amount of trash generated by users of these cartridges multiplies quickly. Another consequence is that users of this machine or similar brewers designed for similar cartridges would have to purchase a different machine to brew beverage from pods made for other brands. The use of multiple machines can be costly and inconvenient, and can cause inefficient use of counter space. Thus, there is a need for an apparatus and method for modifying beverage brewers configured for cartridges so that they can also be used to brew beverages from off-brand pods, or for providing an adapter for the cartridges, adaptable cartridges, or a cartridge replacement.

Additionally, conventional automated pod brewers typically include a brewing chamber adapted to receive an individual pod. During the brewing process, hot water is injected into the brewing chamber across the surface of the pod while brewed beverage is directed to flow out of an outlet into a cup. Some brewed beverage connoisseurs believe that brewed beverage brewed using pod brewers does not have as good flavor extraction as brewed beverage brewed by baristas who usually tamp or compact the beverage brewing material prior to brewing. Thus, there is a need for an improved pod brewing system.

Further, conventional automated pod brewers are not designed to brew brewed beverage or other beverages from loose grounds. A user of such a brewer is limited in selection to the beverage brewing material available for sale in pods, and beverage brewers configured for cartridges limit users to beverage brewing material available for purchase in cartridges. Often, the selection of beverages is limited to coffee, although tea, herbal beverages, yerba mate, and other brewed beverages and infusions are popular and could be brewed using such a machine if an alternative to the pre-packaged cartridges would be available. A brewed beverage drinker who likes a brewed beverage that is only available as loose grounds or as whole beans also cannot brew this brewed beverage in one of these types of brewers.

BRIEF SUMMARY OF THE INVENTION

According to an aspect of the invention, a brewing material container for a beverage brewer includes a receptacle and a lid. The receptacle is configured to receive and hold beverage brewing material and to be placed in a brewing chamber of the beverage brewer, and includes a base, and a sidewall extending from the base and terminating in an open end. The lid is configured to engage with the open end of the sidewall to at least partially cover the open end. The lid includes a number of lid openings, for example five lid openings, configured to receive a corresponding respective number of injection nozzles of the beverage brewer. The receptacle base and/or the receptacle sidewall includes a receptacle opening configured to allow fluid flow from an interior of the receptacle to an exterior of the receptacle.

The lid openings can be, for example, through-holes. The lid can also include dispersion bays arranged at the through-holes and configured to protrude toward an interior of the receptacle when the lid engages with the open end of the sidewall to at least partially cover the open end. The dispersion bays can be configured to protrude from a surface of the at the through-holes, and include apertures. For example, at least some of the apertures can be shaped as slots. The lid can also include one-way valves arranged at the through-holes, such as duckbill valves or umbrella valves.

The receptacle can include a mesh material arranged to cover at least the receptacle opening.

The receptacle opening can include a base opening in the base of the receptacle.

The receptacle opening can include a number of sidewall openings in the sidewall of the receptacle.

The receptacle can include a recessed portion in which the base and the sidewall of the receptacle are recessed inward toward an interior of the receptacle. In the recessed portion, the base can be recessed at least partially toward the open end of the receptacle, and the sidewall can be recessed at least partially toward a center of the base. The recessed portion can form a protrusion into the interior of the receptacle, and a corresponding enclosure on an exterior of the receptacle. The enclosure can be configured to receive an outflow nozzle of the beverage brewer and to isolate the outflow nozzle from the interior of the receptacle.

The receptacle can include a rim at least partially surrounding a periphery of the open end of the sidewall.

The lid can be hingedly connected to the receptacle.

According to another aspect of the invention, a brewing material container for a beverage brewer includes holding means for receiving and holding beverage brewing material and for placement in a brewing chamber of the beverage brewer. The holding means includes base means, and sidewall means for extending from the base means and terminating in an open end. The brewing material container also includes covering means for engaging with the open end of the sidewall means and at least partially covering the open end. The covering means includes a number of cover-receiving means for receiving a corresponding respective plurality of injection nozzles of the beverage brewer. The base means and/or the sidewall means includes fluid flow means for allowing fluid flow from an interior of the holding means to an exterior of the holding means.

The cover receiving means can include through-holes. The cover receiving means can also include dispersion means arranged at the through-holes, for protruding toward an interior of the holding means when the covering means engages with the open end of the sidewall means to at least partially cover the open end. The dispersion means can include flow control means for allowing fluid to pass through the dispersion means and for directing flow of the fluid toward the interior of the holding means.

The holding means can include screen means for covering at least the fluid flow means to allow fluid flow from the interior of the holding means to the exterior of the holding means while retaining the beverage brewing material in the interior of the holding means.

The holding means can include recessed isolation means for receiving an outflow nozzle of the beverage brewer and for isolating the outflow nozzle from the interior of the holding means. The recessed isolation means is defined by a portion of the holding means in which the base means and the sidewall means are recessed inward toward an interior of the holding means.

According to another aspect of the invention, a brewing material container for a beverage brewer includes a receptacle, a lid, and a selective obstruction. The receptacle is configured to receive and hold beverage brewing material and to be placed in a brewing chamber of the beverage brewer, and includes a base, and a sidewall extending from the base and terminating in an open end. The lid is configured to engage with the open end of the sidewall to cover the open end at least partially, and includes a plurality of lid openings configured to receive a corresponding respective plurality of injection nozzles of the beverage brewer. The receptacle base and/or the receptacle sidewall includes a receptacle opening configured to allow fluid flow from an interior of the receptacle to an exterior of the receptacle. The selective obstruction is configured to selectively block one or more of the lid openings.

The selective obstruction can include, for example, a plug configured to be removably coupled to a selected lid opening to prevent fluid communication through the selected lid opening. As another example, the selective obstruction can include a valve configured to be coupled to a selected lid opening to control fluid communication through the selected lid opening. The valve can be, for example, a duck-bill valve or an umbrella valve.

The selective obstruction can include a mat configured to be coupled to the lid and to cover one or more selected lid openings to control fluid communication through the one or more selected lid openings. For example, the mat can include at least one plug and/or at least one valve, which in turn can include a slit in the mat.

The selective obstruction can include a rotatable disk configured to be coupled to the lid and to cover one or more selected lid openings to control fluid communication through the one or more selected lid openings The container can include multiple lids. At least one of the lids can have an arrangement of lid openings that is different than an arrangement of lid openings of another of the lids.

The receptacle base and/or the receptacle sidewall can include a recessed enclosure.

The lid openings can be, for example, through-holes, and the lid can also include dispersion bays arranged at the through-holes and configured to protrude toward an interior of the receptacle when the lid engages with the open end of the sidewall to at least partially cover the open end.

The receptacle opening can include multiple sidewall openings in the sidewall of the receptacle, and a mesh material arranged to cover at least the sidewall openings.

According to another aspect of the invention, a brewing material container for a beverage brewer includes holding means for receiving and holding beverage brewing material and for placement in a brewing chamber of the beverage brewer. The holding means includes base means, and sidewall means for extending from the base means and terminating in an open end. The brewing material container also includes covering means for engaging with the open end of the sidewall means and at least partially covering the open end. The covering means includes a number of cover-receiving means for receiving a corresponding respective plurality of injection nozzles of the beverage brewer. The base means and/or the sidewall means includes fluid flow means for allowing fluid flow from an interior of the holding means to an exterior of the holding means. The brewing material container also includes selective obstruction means for selectively blocking one or more of the cover receiving means.

The cover receiving means can include through-holes. The cover receiving means can also include dispersion means arranged at the through-holes, for protruding toward an interior of the holding means when the covering means engages with the open end of the sidewall means to at least partially cover the open end. The dispersion means can include flow control means for allowing fluid to pass through the dispersion means and for directing flow of the fluid toward the interior of the holding means.

The holding means can include screen means for covering at least the fluid flow means to allow fluid flow from the interior of the holding means to the exterior of the holding means while retaining the beverage brewing material in the interior of the holding means.

The holding means can include recessed isolation means for receiving an outflow nozzle of the beverage brewer and for isolating the outflow nozzle from the interior of the holding means. The recessed isolation means is defined by a portion of the holding means in which the base means and the sidewall means are recessed inward toward an interior of the holding means.

BRIEF DESCRIPTION OF THE DRAWINGS

FIG. 1A is a front view of an exemplary beverage brewer according to the invention.

FIG. 1B is a side view of an exemplary beverage brewer according to the invention.

FIG. 1C is a top view of an exemplary beverage brewer according to the invention.

FIG. 15A shows a side view of an exemplary brewing material holder according to the invention.

FIG. 15B shows a side view of an exemplary brewing material holder according to the invention.

FIG. 15C shows a top view of an exemplary brewing material holder according to the invention.

FIG. 15D shows a bottom side view of an exemplary brewing material holder according to the invention.

FIG. 16A shows a top view of an exemplary brewing material holder according to the invention, with the lid removed.

FIG. 16B shows a bottom side view of an exemplary brewing material holder according to the invention, with the lid removed.

DETAILED DESCRIPTION OF THE INVENTION

Figure 3:
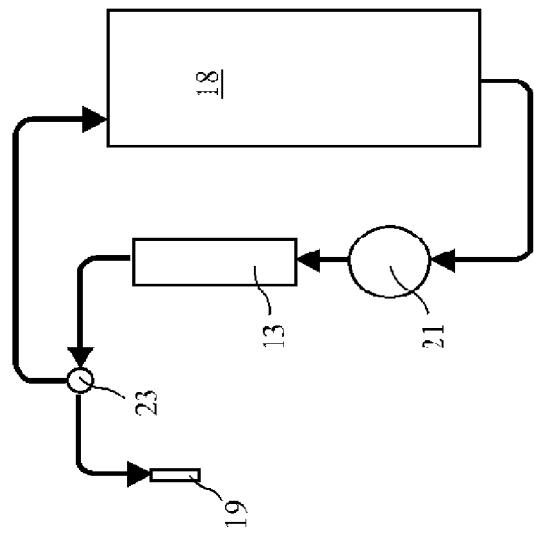
FIG. 3 is a functional diagram of an exemplary beverage brewer.

The following description is not to be taken in a limiting sense, but is presented for the purpose of describing one or more preferred embodiments of the invention. The scope of the invention should be determined with reference to the claims.

With reference to FIGS. 1A-1C, an exemplary beverage brewer 10 includes a body 12, an opening lid 14, a lid handle 16, a water container 18, a display 20, controls 22, a platform 24 and a mouth 12a. A brewed beverage pitcher 26 can be arranged on the platform 24 inside the mouth 12a and has a pitcher lid 28. The beverage brewer 10 provides a flow of hot water through beverage brewing material to produce a brewed beverage. The flow of water can be heated by one of any known mechanisms, for example, through the use of an electrical heating coil or a conductive coating on tubing carrying the water.

Figure 2:
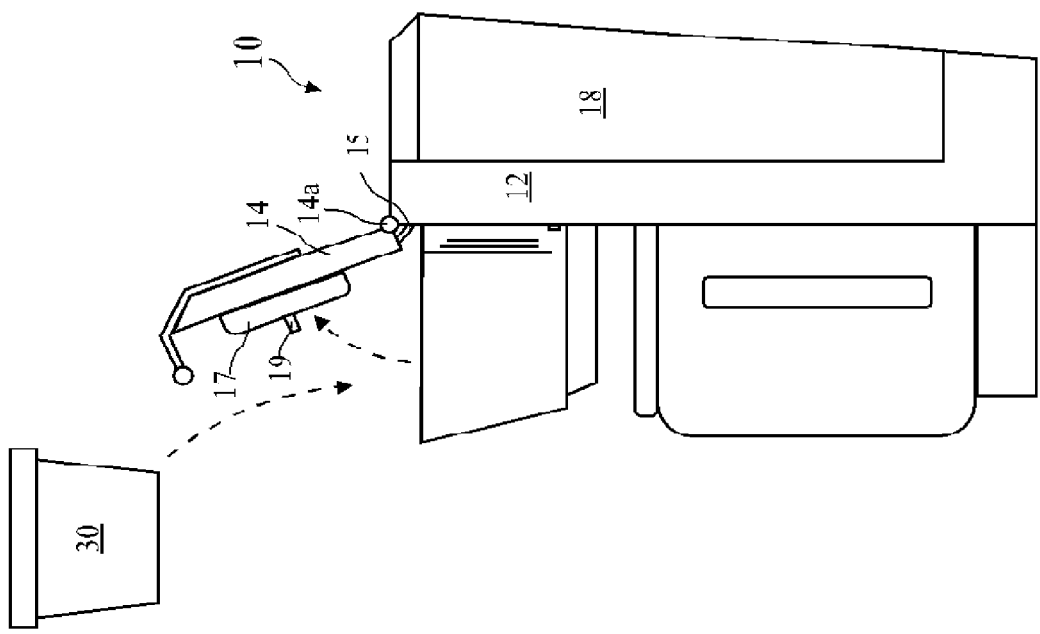
FIG. 2 is a side view of an exemplary beverage brewer with an open lid allowing placement of a brewing material holder according to the invention.

With reference to FIG. 2, the beverage brewer 10 lid 14 can be opened to allow placement of a brewing material holder 30 according to the invention inside the brewing chamber of the beverage brewer 10. The lid 14 includes a lid hinge 14a and a water tube 15, which carries heated water into the lid 14. A pad 17 is arranged on a bottom surface of the lid 14 and presses against the brewing material holder 30 when the lid 14 is closed, and in cooperation with other elements, tamps beverage brewing material contained in the brewing material holder 30. A nozzle 19 extending down from the closed lid 14 directs the flow of hot water into the brewing material holder 30.

Referring to FIG. 3, in general a beverage brewer 10 includes a water tank 18, a water pump 21, a heater 13, a check valve 23, and a nozzle 18. The water heater 13 can include a heating coil or a resistive coating or any other mechanism for heating water. The check valve 23 limits the water pressure at the nozzle 19 by returning some of the water flow to the water tank 18. While a water pump 21 is shown to provide a flow of water to the nozzle 19, other mechanisms can be used to provide a forced flow of water.

Figure 4:
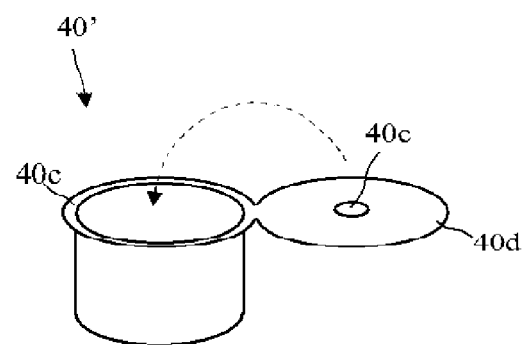
FIG. 4 is a perspective view of an exemplary filter paper cup.

The brewing material holder can be used with a filter paper cup to hold the beverage brewing material. A perspective view of an exemplary filter paper cup 40' with a folding cup lid 40d is shown in FIG. 4. The cup lid 40d can be folded over the rim 40c to reduce or prevent beverage brewing material from escaping during tamping or brewing. The lid 40d can also include a perforation 40e centered on the lid 40d to allow the nozzle 19 to enter and/or inject the hot flow of water into the beverage brewing material 41, but the lid 40d need not include the perforation 40e. The filter paper cup 40' can be used in the beverage brewing material containers described herein, and can be used in a beverage brewing machine having a cavity for receiving the filter paper cup 40'. While the cup 40' is preferably made from filter paper, the cup can also be made from a reusable mesh, such as a nylon or metal mesh.

Figure 5B:
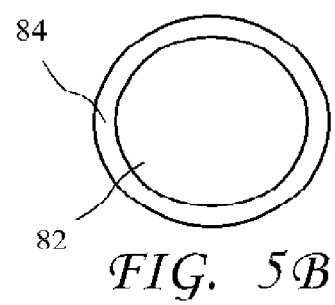
FIG. 5B is a top view of an exemplary filter cup according to the invention.
Figure 5A:
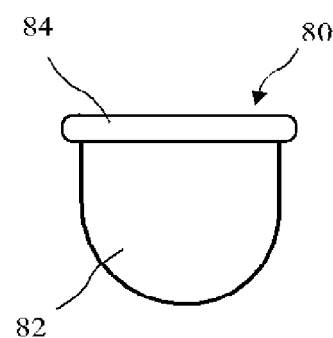
FIG. 5A is a side view of an exemplary filter cup according to the invention.

Referring to FIGS. 5A and B, an exemplary filter cup 80 includes a ring 84 made a of a material sufficiently strong to hold shape while in the brewing machine during the process of brewing a beverage. Filter material 82 is attached to the ring 84. The filter cup 80 can be insertable into the brewing material holder or directly into the brewing chamber as a replacement for the filter paper cup 40.

Figure 6A:
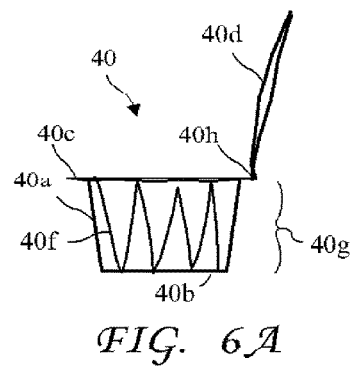
FIG. 6A shows a side view of an exemplary filter paper cup according to the invention.
Figure 6B:
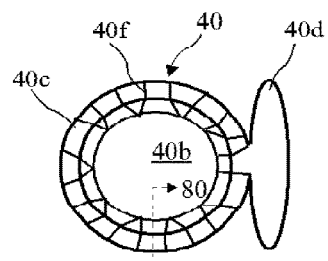
FIG. 6B shows a top view of an exemplary filter paper cup according to the invention.
Figure 6C:
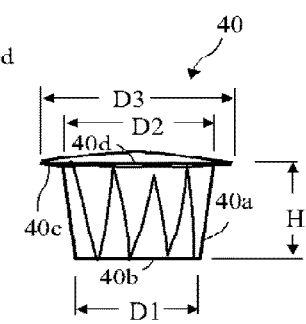
FIG. 6C shows a side view of an exemplary filter paper cup.
Figure 7:
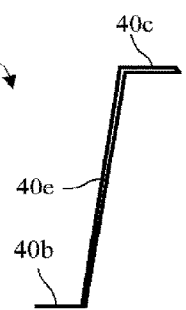
FIG. 7 shows a cross-sectional view of an exemplary filter paper cup taken along line 80-80 of FIG. 6B.

Referring to FIGS. 6A-6C, and a cross-sectional view taken along line 80-80 of FIG. B shown in FIG. 7, the lid 40d of an exemplary filter paper cup 40 can be folded over the cup 40 and sealed after loose brewing material 41 is placed into the cup. The filter paper cup 40 includes a receptacle 40g formed from a bottom 40b, sides 40a, and a rim (for example, and annular rim) 40c, and a cover (or lid) 40d configured to close the receptacle 40g to hold brewing material in the filter paper cup 40. The filter paper cup 40 can be constructed using heat and/or moisture to form permanent folds (or pleats) 40f in the sides 40a and rim 40c of the filter paper cup 40 to add strength and rigidity to the filter paper cup 40 so that the filter paper cup 40 retains its shape after forming, and preferably, adhesive is applied to the rim 40c and/or the sides 40a to retain the pleats and add strength and rigidity to the filter paper cup 40. Preferably, the filter paper cup 40 is constructed from heat-sealable filter paper having a heat-reacting film on at least one side, which film causes the pleats to adhere to adjacent pleats when heat is applied following forming. The pleats in the rim 40c are generally continuations of the pleats in the sides 40a. The filter paper cup 40 can alternatively be corrugated to retain shape. The filter paper cup 40 thus has structure for maintaining a substantially (that is, within the ability of the paper to maintain a shape) frustoconical or cylindrical shape.

As mentioned above, the filter paper cup 40 can have, for example, a frusto-conical shape or a cylindrical shape, for example, having a base diameter D1, an inner top diameter D2, an outer top diameter (the diameter of the rim) D3, and a height H. For particular applications to be suitable for use in a conventional brewing machine, the diameter D1 can be approximately 1.25 inches, the diameter D2 can be approximately 1.625 inches, the diameter D3 can be approximately 2.125 inches, and the height H can be approximately one inch. The rim 40c in this case is therefore approximately 0.25 inches wide, and the lid 40d has approximately the same diameter D3 as the rim 40c.

The filter paper cup 40 can be sold or otherwise provided in an empty state for filling by a user, or as a pre-packaged single-serving (or larger) beverage brewing material pod. When provided for filling by the user, the filter paper cup 40 is preferably provided with the cover 40d attached to the rim 40c of the receptacle 40g. For example, the filter paper cup 40 can be made from a single piece of filter paper cut into two circular portions attached by a hinge 40h, or by two separately cut pieces of filter paper attached at the hinge 40h. The filter paper cup 40 can be provided as two pieces, in which case the cover 40d is detached from the receptacle 40g, but this can be more difficult to use. A user can seal the cover 40d to the rim 40c of the receptacle 40g, or the cover 40d can be held to the receptacle 40g by sandwiching the filter paper cup 40 between a holder lid 32a and holder body 31. When the filter paper cup 40 is sold as a ready-to-use pod containing brewing material, the pod is generally fabricated using filter paper off two separate rolls as described below.

Figure 8A:
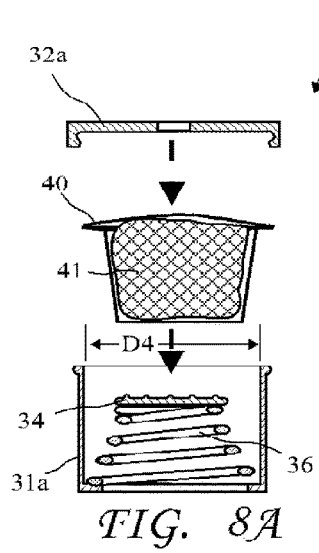
FIG. 8A is a cross-sectional side view of an exemplary brewing material holder according to the invention.
Figure 8B:
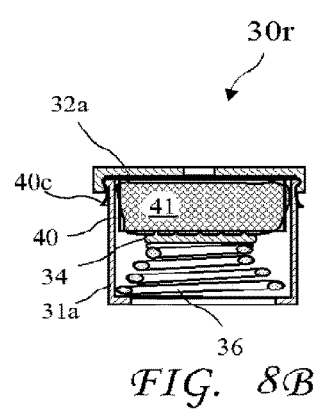
FIG. 8B is a cross-sectional side view of an exemplary brewing material holder according to the invention.

An exemplary pod holder 30r with a tamping spring 36 and bottom tamper 34, the filter paper cup 40 containing a portion of beverage brewing material 41, and the holder lid 32a ready to attach to a holder body 31a is shown in FIG. 8A, and with the holder lid attached to the holder body with the rim of the filter paper cup sandwiched between the lid and brewing material holder and the tamping spring and bottom tamper pushing the filter paper cup against the lid according to the invention is shown in FIG. 8B. The rim 40c is arranged on a top edge of the holder body 31 and is sandwiched between the holder lid 32a and body 31a when the lid 32a is attached to the body 31a, thereby holding the filter paper cup 40 against the holder lid 32a while a needle inserted through the holder lid 32a will puncture the folding paper lid 40d and inject hot water into the filter paper cup 40. Thus the brewing material 41 can be retained in the filter paper cup 40 solely by attaching a lid 32a of the pod holder 30r to the base 31a of the pod holder to sandwich the rim 40c of the filter paper cup 40 and the outer edge of the cover 40d between the lid of the pod holder to the base of the pod holder.

The inside diameter D4 of the mouth of the pod holder 30r can be approximately the same size as the Diameter D2 of the filter paper cup 40, for example, approximately 1.625 inches, thereby facilitating the capture and sandwiching of the rim 40c and edge of the cover 40d between the holder lid 32a and body 31a. Sandwiching of the rim 40c and edge of the cover 40d between the holder lid 32a and body 31a both seals the brewing material in the filter paper cup 40 to prevent or restrict the escape of the brewing material from the filter paper cup 40 during brewing and provides a taut cover 40d facilitating puncturing the cover 40d by a needle used to inject heated water into the filter paper cup 40 during brewing. The body 31a can have a cylindrical or frusto-conical shape, or any other shape that would function advantageously in the brewing chamber.

Figure 9:
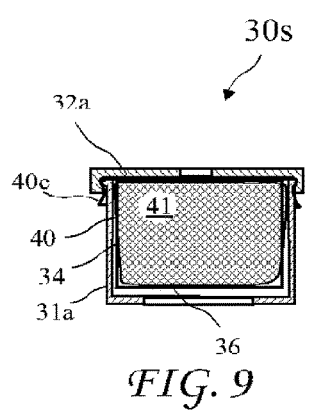
FIG. 9 shows a cross-sectional view of an exemplary brewing material holder according to the invention.

Another exemplary embodiment of the brewing material holder 30s is shown in FIG. 9. The brewing material holder 30a is similar to the brewing material holder 30s but omits the tamping spring 36 and bottom tamper 34.

Figure 10A:
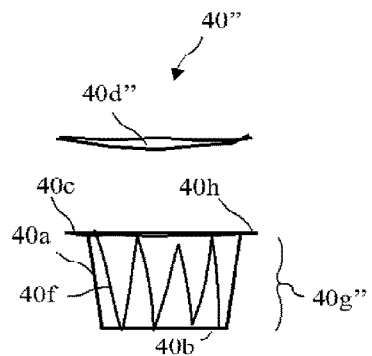
FIG. 10A shows a side view of an exemplary filter paper cup with a separate receptacle and paper lid according to the invention.
Figure 10C:
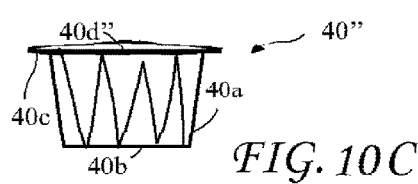
FIG. 10C shows a side view of an exemplary filter paper cup.
Figure 10B:
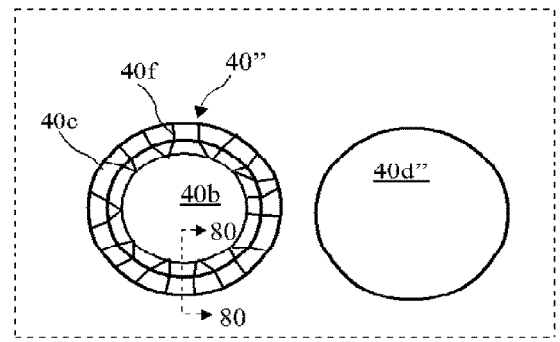
FIG. 10B shows a top view of an exemplary filter paper cup with a separate receptacle and paper lid according to the invention.

A filter paper cup 40" with separate receptacle 40g" and paper lid 40d" is shown in FIGS. 10A-C. The filter paper cup 40" includes the features of the filter paper cup 40, except the lid 40d" is not hingedly attached to the receptacle 40g" and is a separate piece. Further, the receptacle 40g" can be used in the beverage brewer without the lid 40d".

Figure 11A:
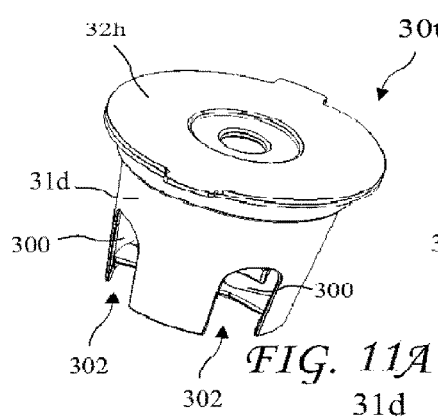
FIG. 11A shows a top and side view of an exemplary brewing material holder according to the invention.
Figure 11B:
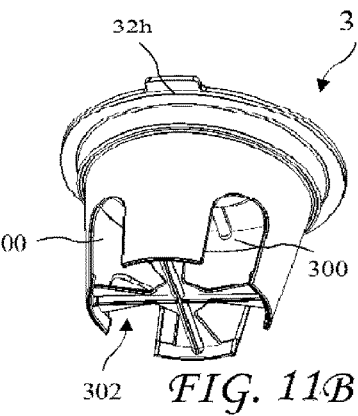
FIG. 11B shows a bottom and side view of an exemplary brewing material holder according to the invention.
Figure 12:
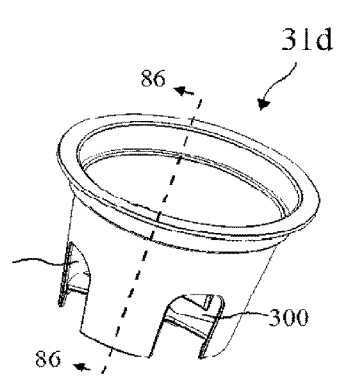
FIG. 12 shows a top and side view of an exemplary brewing material holder according to the invention.
Figure 13:
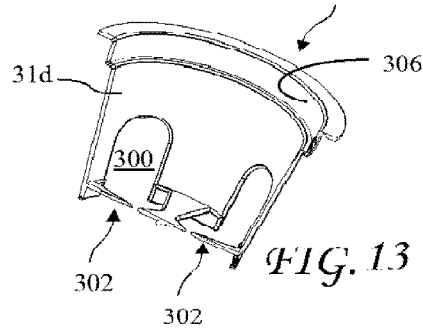
FIG. 13 shows a cross-sectional view of an exemplary brewing material holder according to the invention taken along line 86-86 of FIG. 12.

An exemplary brewing material holder 30t with a lid 32h is shown in FIGS. 11A and B, with a lid 32h removed in FIG. 12, and in cross-section with the lid 32h removed, taken along line 86-86 of FIG. 12, in FIG. 13. The base 31d includes multiple side windows 350 and multiple bottom windows 352, for example four side windows 350 and bottom windows 352. The windows 350 and 352 allow unrestricted flow from a filter material receptacle 40g" (see FIG. 10C) arranged inside the base 31d, and allow portions of the filter material receptacle 40g" to expand into and through the windows 350 and 352. Alternatively, the windows 350 and 352 can be covered with a mesh material, such as nylon or metal mesh, in which case a filter material receptacle 40g" is not necessary.

Figure 14A:
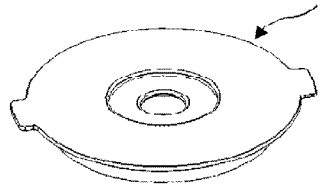
FIG. 14A is a top view of a lid of an exemplary brewing material holder according to the invention.
Figure 14B:
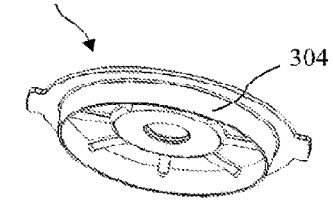
FIG. 14B is a bottom view of a lid of an exemplary brewing material holder according to the invention.

An exemplary lid 32h of the brewing material holder 30t is shown in FIGS. 14A and B. The lid 32h includes a round skirt 354 which cooperates with an annular interior surface 356 of the base 31d to sandwich the filter material receptacle 40g", retaining the filter material receptacle 40g" in the base 31d.

Additional views of the brewing material holder 30t are shown in FIGS. 15A-D, and views with the lid 32h removed are shown in FIGS. 16A and B. The brewing material holder 30t can be fabricated to any dimensions, such as an exemplary embodiment in which the base 31d has a height Hb of about 1.45 inches and a base bottom diameter Db of about 1.35 inches; wall windows 350 with a height Hw of between 0.5 inches and one inch, such as about 0.72 inches measured to a peak of an arched opening, and a window width Ww of between 0.3 inches and 0.7 inches, such as about 0.45 inches.

An exemplary method for manufacturing the filter paper cups includes providing filter paper to a machine and forming a receptacle in the filter paper. Heat and/or steam is used to make the filter paper retain the receptacle shape. The receptacle and the lid are then cut out. To manufacture a pod according to the invention, the receptacle is filled with brewing material, which can be tamped in the receptacle. The lid is positioned over the receptacle and the lid is attached to the receptacle. The pod can be nitrogen flushed and sealed. Either the filter paper cups or the completed pods can be manufactured, for example, in printing press or assembly line style.

Although the invention is described above as placing loose beverage brewing material in a brewing material holder, the invention can also be practiced by placing prepackaged beverage brewing material, for example a beverage brewing material pod, into the brewing material holder. Further, although the brewing material holder is generally described as having a snap-on lid, a screw-on lid can also be used, and in general the various elements of different embodiments described above can be mixed to provide combinations of elements that are intended to be included within the scope of the invention.

Further, although a filter paper cup has been described, a filter cup made of nylon mesh or metal mesh is equally suitable, and any brewing material holder or combination of beverage brewer and brewing material holder including a filter chamber that holds beverage brewing material as described above is intended to be included within the scope of the invention regardless of the specific filter material. Further, those skilled in the art will recognize that the features and elements of the various described embodiments of the invention disclosed herein can be combined to provide various combinations, all of which combinations are intended to be included within the scope of the invention.

As discussed above, a conventional brewing cartridge includes a pierceable shell and contains brewing material held in the cartridge by filter material. An upper needle, or liquid injector probe, of the beverage brewer penetrates the top of the shell, and a bottom needle element, typically offset from the center, penetrates the shell from below when the brewing chamber is closed on the cartridge. The upper needle enters the brewing cartridge and contacts the brewing material, whereas the lower needle pierces the shell but typically avoids contact with the brewing material. A cartridge-style, beverage brewer sold under the brand Keurig is configured to use a brewing cartridge sold under the brand K-Cup. The K-Cup brewing cartridges have a frusto-conical shape, a height of about 1¾ inches, a top rim having a diameter of about 2 inches, a diameter just below the top rim of about 1.8 inches, and a base having a diameter of about 1.43 inches.

Figure 17A:
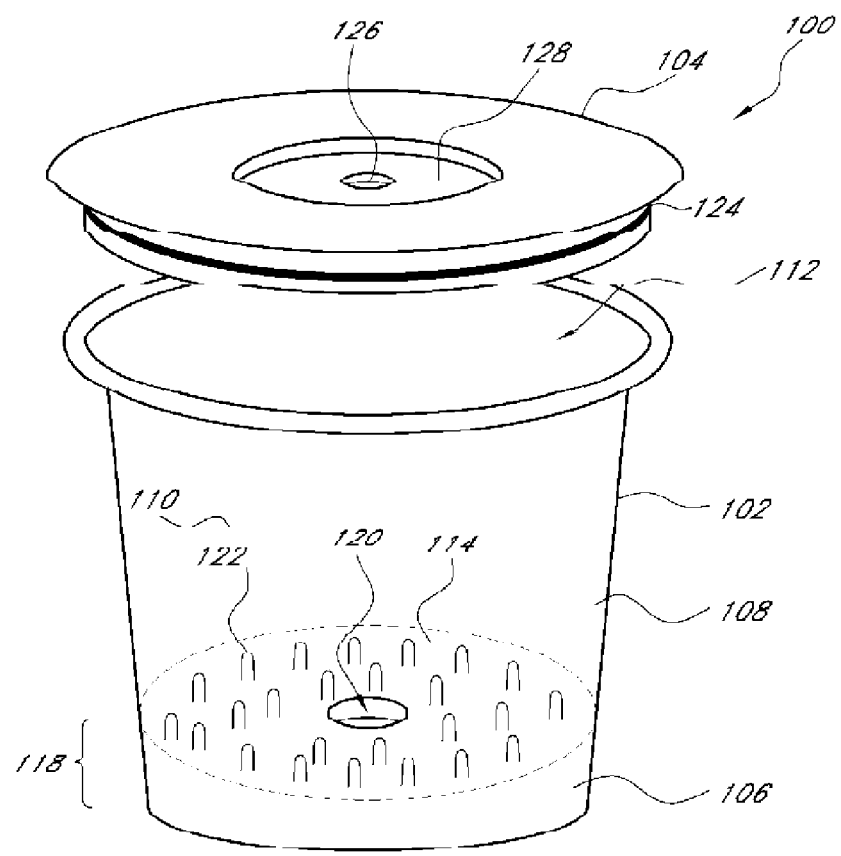
FIG. 17A is a schematic illustration of an exemplary pod adaptor assembly according to the invention.

FIG. 17A illustrates a pod adaptor assembly 100 of an embodiment of the invention. As shown in FIG. 17A, the pod adaptor assembly 100 generally includes a cup-shaped, that is, truncated cone-shaped, receptacle 102, and a cover 104 adapted to sealingly engage with the receptacle 102. The receptacle 102 has a substantially circular base 106 and sidewalls 108 extending upward from the base 106 to define a housing 110 having an upper opening 112. The base 106 has an interior surface 114 and an exterior surface 116, which are separated by a distance 118 so that the interior surface 114 is elevated above the exterior surface by the distance. Preferably, the distance 118 is between about 1 and 20 mm. For example, in a particular exemplary embodiment the distance is about 10 mm. Although some embodiments of the pod assembly utilize a cup-shaped receptacle, the receptacle can assume other shapes and configurations such as square or cylindrical without departing from the spirit and scope of the invention.

As also shown in FIG. 17A, a passageway 120 is formed in the base 106 of the receptacle 102, extending between the interior and exterior surfaces 114, 116 of the base 106. The passageway 120 is configured to receive a needle-like structure that is typically mounted in the beverage brewer to puncture the bottom of a disposable cup-shaped filter. The location of the passageway 120 relative to the base 106 is preferably selected to match the relative location of the needle-like structure in the brewer. In a particular embodiment, the passageway 120 is slightly off-center from the base to correspond to the location of the needle. In operation, the needle-like structure is designed to move upward toward the bottom of the base 104 of the receptacle a first distance so as to puncture the bottom of the cup-shaped filter. To prevent the needle-like structure from hitting against the base of the receptacle or piercing the beverage pod inside the receptacle, the passageway 120 allows the needle-like structure to move freely without jamming against the receptacle or the pod. The passageway 120 also serves the purpose of providing an outlet for brewed beverage to flow out of the receptacle into a drinking or serving vessel. In one embodiment, the passageway 120 is substantially circular and has a diameter of about 5 mm and a length of about 10 mm.

Figure 17B:
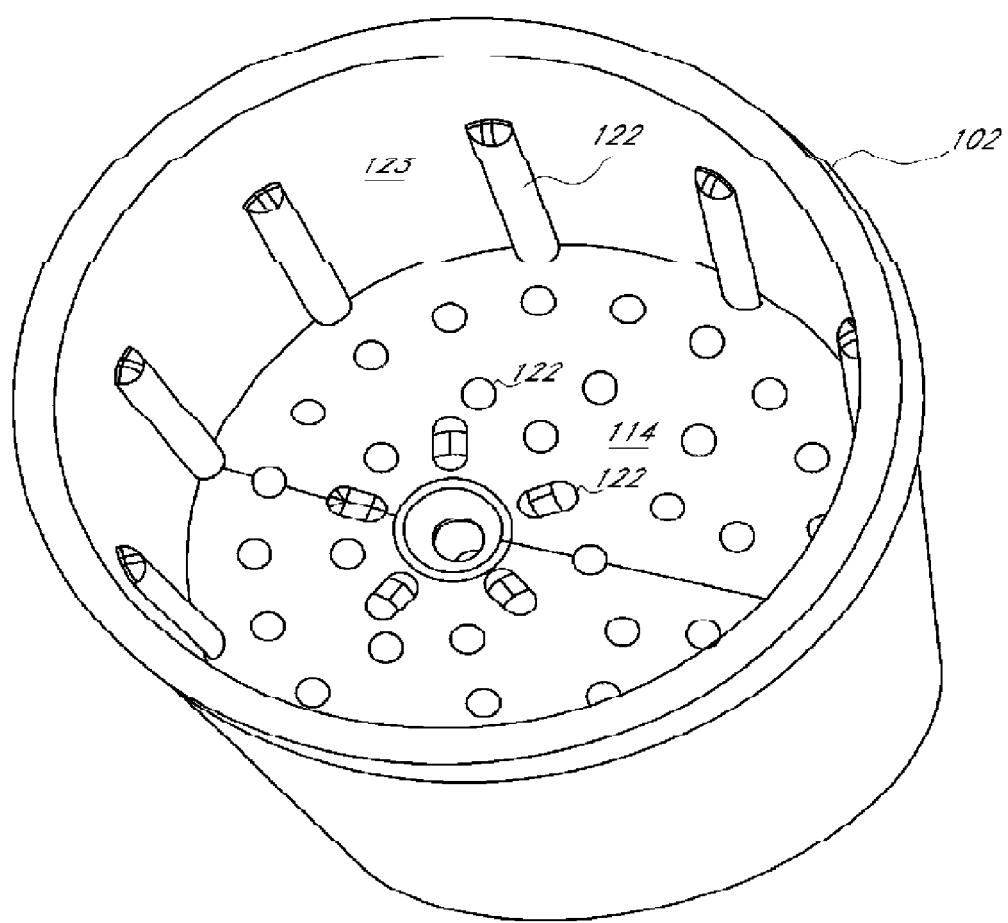
FIG. 17B is a schematic illustration of an exemplary receptacle of the pod adaptor assembly of FIG. 17A.

As FIG. 17A further shows, a plurality of spaced-apart protrusions 122 are formed across the interior surface 114 of the base. The protrusions 122 collectively provide a plurality of spaced-apart raised surfaces for the pod to rest against. When the pod is placed inside the receptacle and is resting against the protrusions, the gaps between the pod and the interior surface 114 of the base allow brewed beverage to flow unobstructed from the pod down through the passageway 120. In one implementation, the protrusions can be configured in the manner shown in FIG. 17B. As shown in FIG. 17B, the protrusions 122 comprise a plurality of circular and oval-shaped protrusions extending upward from the lower surface 114 of the receptacle 102. In some implementations, a plurality of ribs 122 are also arranged to extend outwardly from an interior side surface 123 of the receptacle 102.

As also shown in FIG. 17A, the cover 104 of the assembly 100 has a circular configuration and a seal 124 sized to sealingly engage the cover 104 to the receptacle opening 112 in a manner known in the art. The cover 104 has an opening 126 configured to accommodate a liquid inlet probe or other inlet port from the brewer. The liquid inlet probe is typically used to pierce the cup-shaped filter cartridge and introduce pressurized hot water into the cartridge. In certain embodiments, the cover 104 also has a circular recessed section 128 disposed concentrically around the opening 126. The circular recessed section 128 is adapted to mate with a correspondingly shaped circular protrusion formed on the brewer. The cover 104 includes a rim resting on a top edge of the receptacle 102 at the top of the sidewall 108. In some embodiments, the rim extends radially beyond the top edge.

Figure 17C:
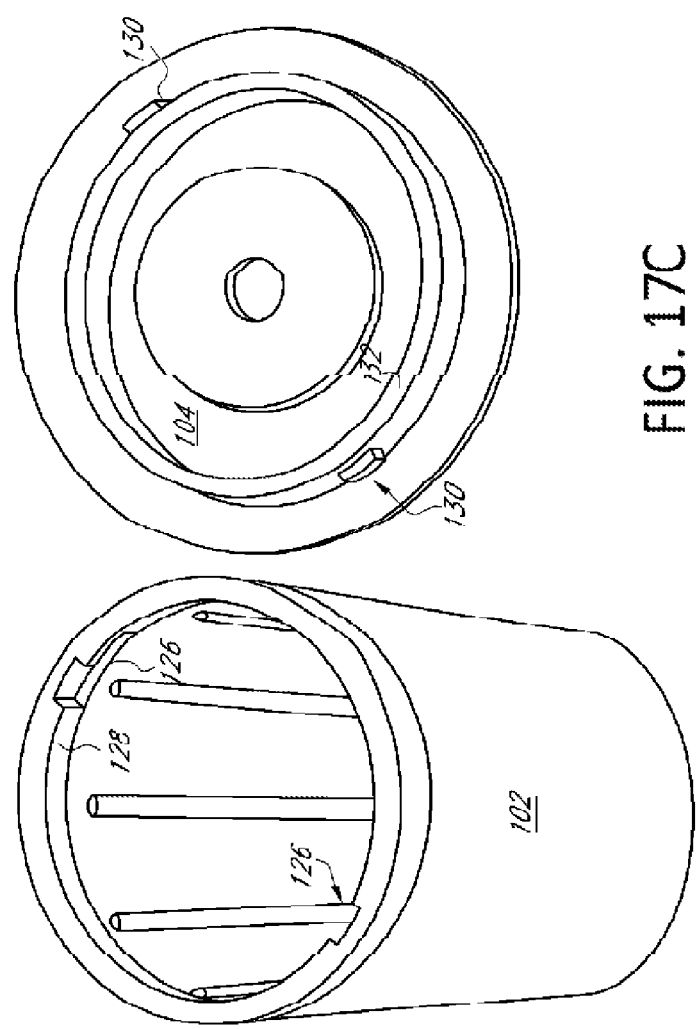
FIG. 17C is a schematic illustration of an exemplary receptacle of the pod adaptor assembly of FIG. 17A.

In certain embodiments, the assembly 100 further includes a locking mechanism adapted to lock the cover in place relative to the receptacle. FIG. 17C illustrates one example of such locking mechanism. As shown in FIG. 17C, a plurality of notches 126 are formed in the interior rim of the receptacle. The notches 126 are configured to engage with mating protrusions 130 formed on an interior rim 132 of the cover 104. When the cover 104 is positioned over the opening of the receptacle 102, the protrusions 130 on the interior rim 132 of the cover preferably slidably engage with the notch so as to lock the cover in place. It will be appreciated that other locking mechanisms known in the art can also be used to lock the cover in place.

Figure 18:
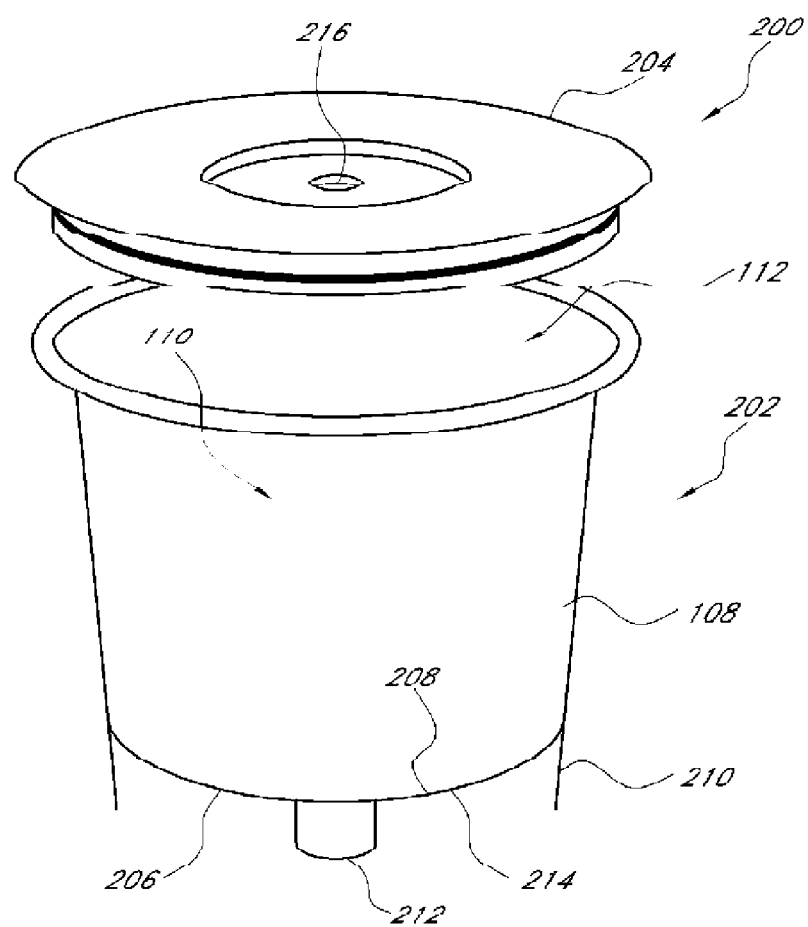
FIG. 18 is a schematic illustration of an exemplary pod adaptor assembly according to the invention.

FIG. 18 illustrates a pod adaptor assembly 200 of another embodiment of the invention. The pod adaptor assembly 200 generally includes a cup-shaped receptacle 202 adapted to receive a pod and a cover 204 adapted to sealingly engage with the receptacle 202. The receptacle 202 has a base 206 having a downwardly sloping interior surface 208 supported by a plurality of legs 210. A passageway 212 extends downwardly from the exterior surface 214 of the base. The passageway 212 is adapted to guide and allow the needle-like structure from the brewer to extend upward without hitting against the receptacle or piercing the pod inside the receptacle. The passageway 212 also permits outflow of the brewed beverage from the receptacle. In one embodiment, the passageway 212 has a diameter of about 5 mm and a length of about 1 mm to 20 mm. The location of the passageway 212 relative to the base 206 is preferably selected to correspond to the location of the upward-moving needle in the brewer. In one embodiment, the passageway 212 is offset by about 1-5 mm from the center of the base. As also shown in FIG. 18, the cover 204 of the assembly 200 has an opening 216 formed therethrough, which is adapted to allow insertion of a liquid inlet probe from the brewer.

Figure 19A:
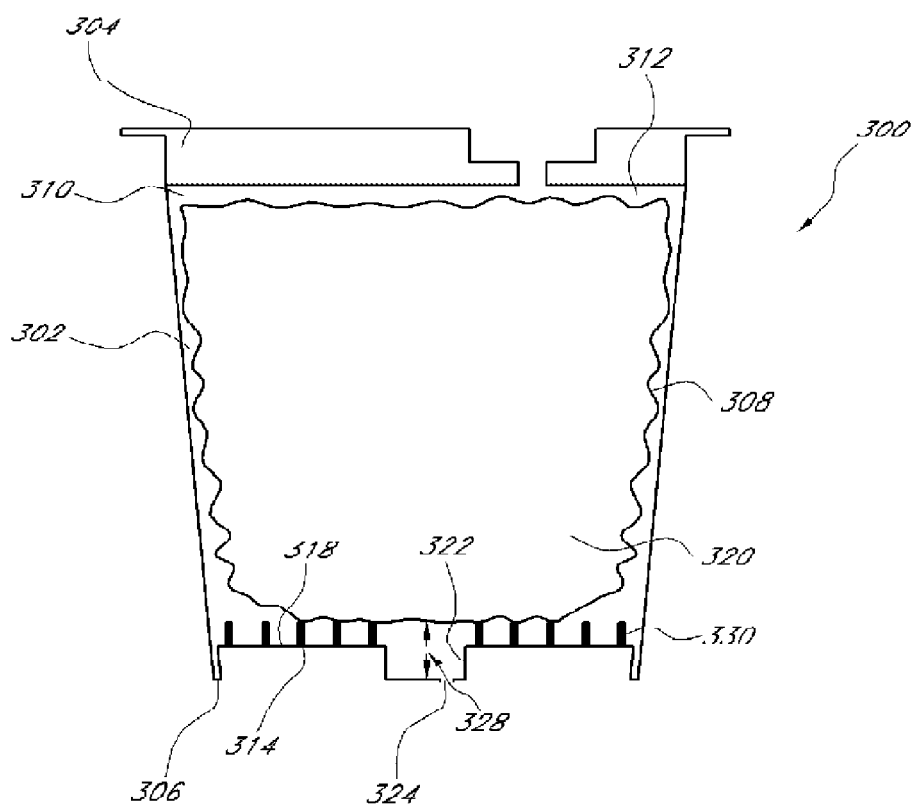
FIG. 19A is a schematic illustration of an exemplary pod adaptor assembly according to the invention.

FIG. 19A is a schematic illustration of a pod adaptor assembly 300 of another embodiment of the invention. The pod adaptor assembly 300 generally includes a receptacle 302 and a cover 304 adapted to sealingly engage with the receptacle 302. The receptacle 302 has a substantially circular base 306 and sidewalls 308 extending upward from the base 306 defining a housing 310 having an upper opening 312. The base 306 has an annular raised portion 314 extending upward from a lower surface 316 of the base and an opening 324 formed in a portion of the base that is not raised. The raised portion 314 provides a raised support surface 318 for a pod 320 so that the pod 320 does not contact and possibly block the opening 324 for brewed beverage to flow through. Preferably, the lower surface of the pod 320 is also elevated from the opening 324 by a distance 328 that is calculated to accommodate the upward extension of the puncture needle in the brewer during operation. In one embodiment, the distance 328 is between about 5 to 20 mm. In certain embodiments, a plurality of spaced-apart protrusions 330 are formed on the raised support surface 318, the protrusions 330 providing upward support for the pod 320. The gaps between the protrusions facilitate flow of brewed beverage from the pod toward the opening 324.

Figure 19B:
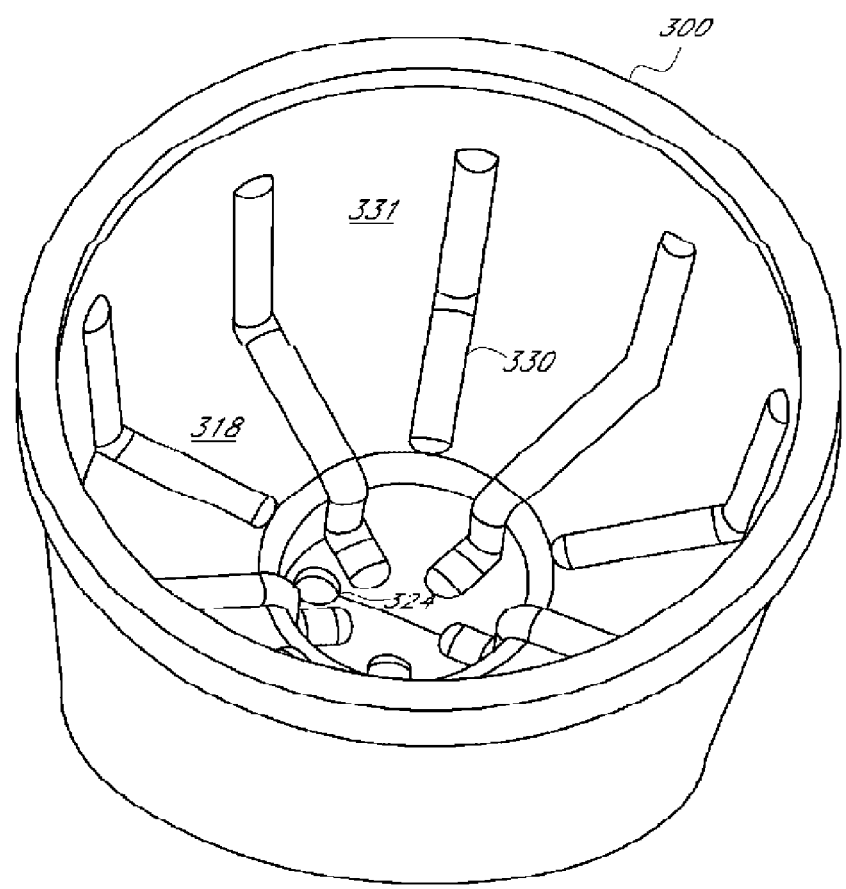
FIG. 19B is a schematic illustration of an exemplary receptacle of the pod adaptor assembly of FIG. 19A.

FIG. 19B illustrates radially-extending protrusions 330 of one implementation for the receptacle 300 of FIG. 19A. As shown in FIG. 19B, the protrusions 330 comprise a plurality of spaced-apart ribs disposed on an interior side wall 331 and both the raised and non-raised interior surface portions 318. As also shown in FIG. 19B, the opening 324 is located at an offset from the center of the base of the receptacle. The location is selected to correspond to the location of the puncture needle when the assembly is placed in the brewing chamber of the brewer.

Figure 20:
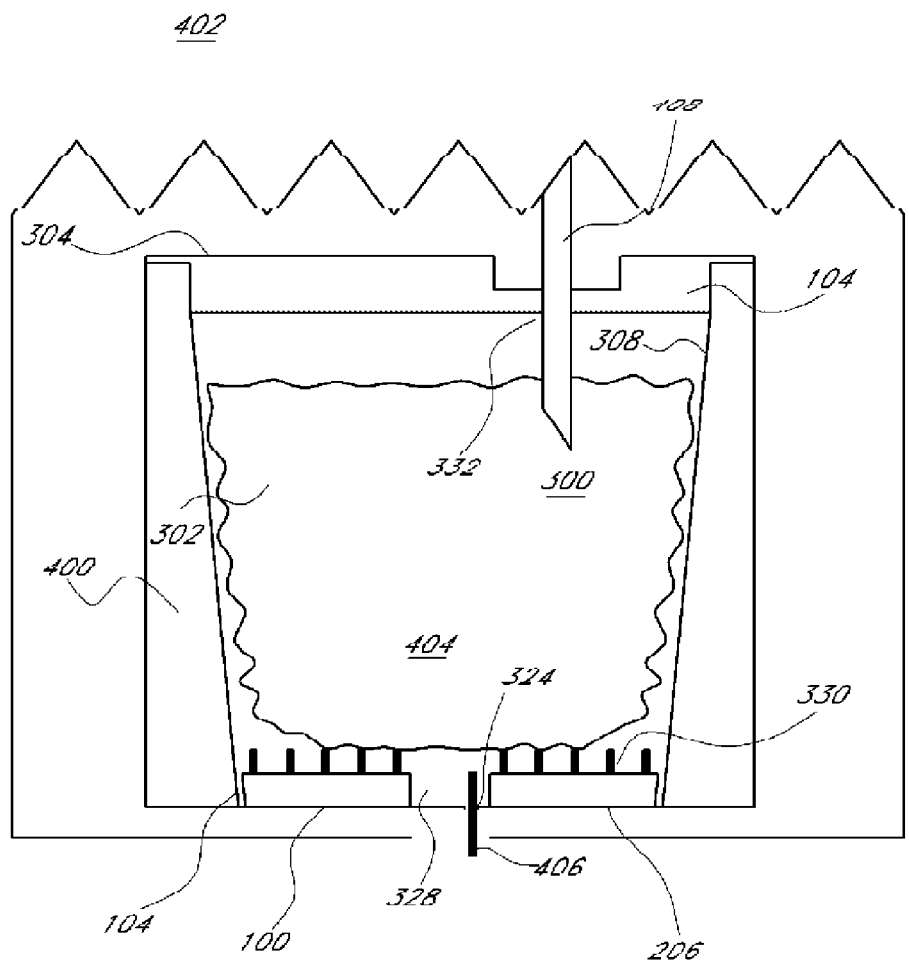
FIG. 20 is a schematic illustration of an exemplary pod adaptor assembly of FIG. 19 used in combination with a beverage brewer having upper and lower puncturing devices.

FIG. 20 is a schematic illustration of the pod adaptor assembly of FIG. 3A used in conjunction with a single-serving beverage brewer in brewing a beverage pod. As shown in FIG. 4, the pod adaptor assembly 300 is placed in a brewing chamber 400 of a single-serving brewer 402 known in the art and configured for brewing cup-shaped filter cartridges. In one embodiment, the single-serving brewer 402 is sold under the brand Keurig. As also shown in FIG. 20, a beverage pod 404, preferably containing beverage brewing material, is positioned inside the receptacle 302 of the assembly 100. The pod 402 preferably fits snugly inside the receptacle 302 and rests against the protrusion 330. In operation, a lower puncture needle 406 of the brewer extends upward through the passageway 116 of the receptacle 102. As described above, the lower puncture needle 406 is designed to extend upward and puncture the bottom of a cup-shaped cartridge that is normally inside the brewing chamber. To adapt the brewer 402 for use in brewing beverage pods that do not need to be punctured, the opening 324 in the base of the receptacle allows the puncture needle 406 to extend into the receptacle and the distance 328 between the opening 324 and the pod 404 is dimensioned such that the puncture needle 406 does not contact and pierce the pod 404. The distance advantageously provides an offset that accommodates the upward movement of lower puncture needle 406 without piercing the pod or damaging the needle. As also shown in FIG. 20, a liquid inlet probe 408 is extended downwardly through an opening 332 formed in the cover 304 of the assembly 300. In some embodiments, the pod 404 is positioned such that the liquid inlet probe 408 punctures the pod 404. In other embodiments, the pod 404 is positioned such that the liquid inlet probe 408 does not puncture the pod.

Figure 21:
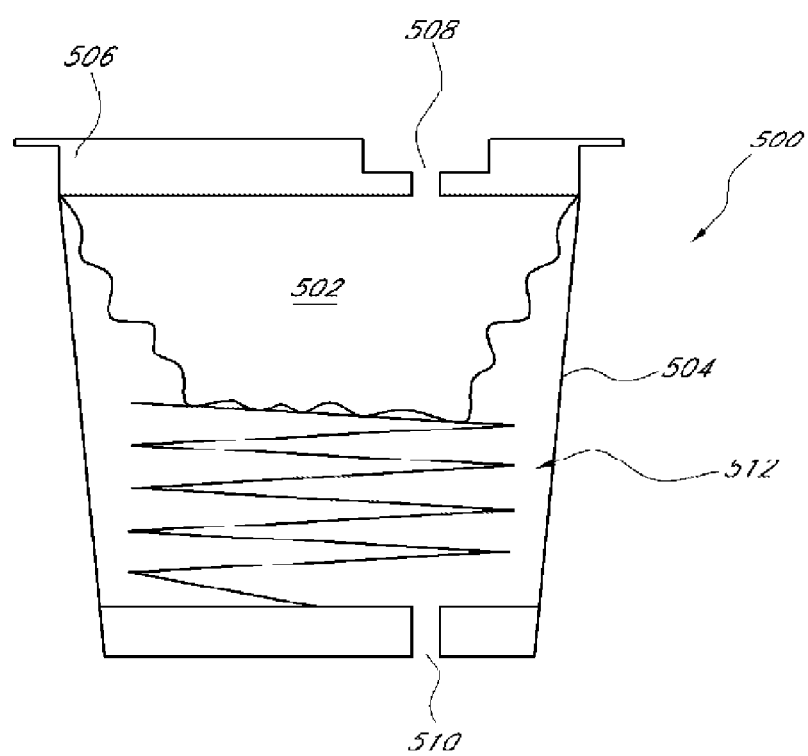
FIG. 21 is a schematic illustration of an exemplary pod adaptor assembly according to the invention.

FIG. 21 is a schematic illustration of another embodiment of the pod adaptor assembly 500 of the invention, showing a cross-section of the assembly when used with a beverage pod 502. The pod adaptor assembly 500 includes a receptacle 504 and a cover 506 adapted to sealingly engage with the receptacle 504. The assembly 500 further includes a biasing mechanism 512 adapted to elevate and press the pod 502 against the cover 506 when the cover is sealingly engaged with the receptacle 504. In one implementation, the pressure applied against the pod advantageously compacts the beverage brewing material in the pod which has a similar effect as tamping the beverage brewing material. In certain embodiments, the assembly has an inlet 508 for introducing pressurized hot water into the receptacle and an outlet 510 for allowing outflow of brewed beverage. In one implementation as shown in FIG. 21, the inlet 508 is an opening formed in the cover 506 that is also adapted to receive a liquid inlet probe, which is part of a single-serving beverage brewers designed for cup-shaped cartridges. Also in the implementation shown in FIG. 21, the outlet 510 includes an opening formed in the base of the receptacle to allow for outflow of brewed beverage from the receptacle as well as unobstructed upward extension of a puncture needle that is part of certain single-serving beverage brewers designed for cup-shaped cartridges. By pressing the pod up against the cover, the pod is also pressed up against the inlet 508 through which hot water flows into the chamber. This advantageously "traps" the hot water in the pod for a longer period of time and produces a stronger and more consistent brewed beverage. In addition to being an adaptor assembly for cup-shaped brewers, the receptacle having a biasing device as shown in FIG. 21 can also serve as a brewing chamber for pod brewers.

In one embodiment, the biasing mechanism 512 is a spring positioned inside the receptacle and extending upward from the base. The flexibility of the spring is advantageous because it provides an adjustable support surface that can accommodate and apply pressure against pods of a variety of different sizes. In cases of thicker or larger pods, the spring can be simply compressed more to accommodate the pods. The spring can push the pods of different thicknesses and sizes up against the hot water being introduced into the receptacle. It will also be appreciated that a variety of different biasing mechanisms can also be used to press the pod against the inlet hot water. For example, the biasing mechanism can be a spring attached to the interior of the cover. As described above, pushing the pod against the hot water inlet compacts the beverage brewing material and also causes much less water to escape from the pod during the brewing process. As a result, a much stronger and consistent cup of brewed beverage is produced.

Figure 22:
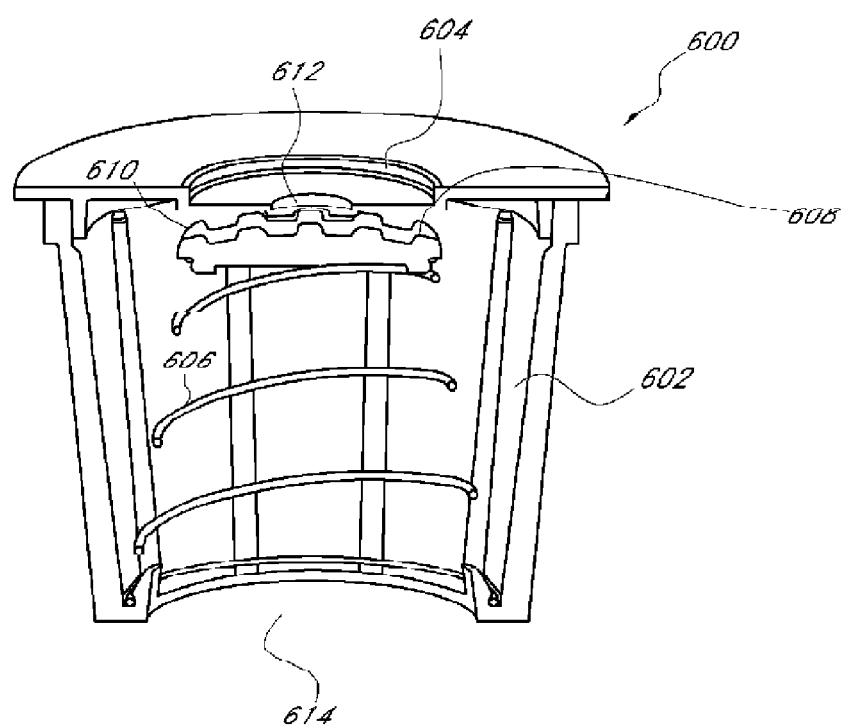
FIG. 22 is a cross-sectional view of an exemplary pod brewing chamber according to the invention.

FIG. 22 is a cross-sectional view of a pod brewing chamber 600 of an embodiment of the invention incorporating the novel biasing mechanism. The pod brewing chamber 600 includes a cup-shaped housing 602 and a cover 604. Preferably, the housing 602 is sized to receive a circular beverage pod. In a particular exemplary embodiment, the housing 602 has a height of about 44.5 mm, a lower diameter of about 35 mm and an upper diameter of about 45.5 mm. As also shown in FIG. 22, the brewing chamber 600 further includes a spring 606 extending upward from the bottom of the housing and a platform 608 attached to the upper end of the spring 606. In one implementation, the platform 608 includes a circular support having ribs arranged in a spaced-apart configuration across the upper surface of the platform 608. In operation, a beverage brewing material pod is inserted into the housing by being placed on the platform 608 and pressed downwardly until the pod is inside the housing and the cover 604 can be placed over the opening of the housing. As also shown in FIG. 22, the cover 604 has an opening 612 through which hot water can be injected into the housing. The brewing chamber further includes a lower opening 614 for brewed beverage to flow out of the chamber.

The unique concept of providing a biasing mechanism to press a beverage brewing material pod against the hot water inlet in a pod brewer can be applied to a variety of different beverage brewing systems. Preferably, when the spring is fully compressed, the force applied to a pod is preferably about 1.5 lb. The pressure range exerted against the pod can preferably range between 0 and 1.5 lbs. Thus, for example, a large pod will have more pressure exerted on it than a smaller pod, because the spring is compressed more. Moreover, the cross-section of the platform is preferably smaller than the diameter of the bottom so it can travel up and down the cup-shaped housing. In certain embodiments, the platform serves two functions by preventing the needle in certain single beverage brewers from perforating the pod from the bottom and also by pushing the pod evenly against the hot water inlet so when brewing the brewed beverage produced is consistent.

As described above, the pressure applied against the pod by the biasing mechanism compacts the beverage brewing material and serves the function of tamping the beverage brewing material. Thus, less beverage brewing material is required to be packaged in a pod to brew a cup of brewed beverage using the pod adapter of the invention. It will be appreciated that the biasing mechanism can also be incorporated in any of the pod adaptor assemblies described herein. The pod adaptor assembly of the invention can be made of a variety of different materials, including metal and plastics.

It should be apparent to those of skill in the art that the various embodiments of the invention as described herein can be used with loose grounds held by an open pouch made of water-permeable material. Such a pouch can be filled with beverage brewing material of the user's choice and inserted into the pod adapter in place of a pod as described above. The water-permeable pouch can include a lid made of like material, either provided separately or hingedly attached to the pouch. Alternatively, the pod adapter can include a screen over the lower opening, or on the sidewall, so that loose grounds can be placed directly into the pod adapter for brewing, without the need for a pod or water-permeable pouch.

In summary, a beverage brewing container according to the invention is configured to replace a brewing cartridge in a brewing chamber of a beverage brewer, and preferably is made of material that allows it to be reusable. The container is positionable within the brewing chamber and is configured to hold brewing material while brewed by the beverage brewer. Depending on the particular embodiment or the needs of the user, the brewing material can be sealed in a pod, can be loosely placed in a pouch made of water-permeable material, or can be placed directly into the beverage brewing container. The brewing material can be beverage brewing material, or any other material, ground or otherwise, that can be used to produce a beverage by flowing a liquid through it.

The beverage brewing container includes a receptacle configured to receive and support the brewing material, and a cover. The receptacle includes a passageway, a base, and at least one sidewall. The passageway, for example, can be arranged in the base of the receptacle, but can be arranged in the sidewall instead, or in addition if more than one passageway is advantageous. The passageway provides fluid communication between an interior of the receptacle and the brewing chamber, that is, allows the brewed beverage to flow from the container into the brewing chamber of the beverage brewer. The passageway can have a serpentine arrangement, or can be wholly unobstructed, to provide direct flow.

The base of the receptacle has an interior surface and an exterior surface and is configured to avoid contact with the needle-like structure of the beverage brewer. The at least one sidewall extends upward from the interior surface of the base and is also configured to avoid contact with the needle-like structure. The cover is adapted to sealingly engage with a top edge of the at least one sidewall and includes an opening. Thus, the container can accept input fluid through the opening in the cover to allow the beverage material to be brewed, and can provide the corresponding outflow of fluid through the passageway. Because contact with the needle-like structure of the beverage brewer is avoided, the outflow substantially avoids the needle-like structure, which would normally accept the outflow. By avoiding the needle, the outflow can proceed elsewhere into the brewing chamber or directly into a mug or other vessel used to serve the beverage.

Figure 23:
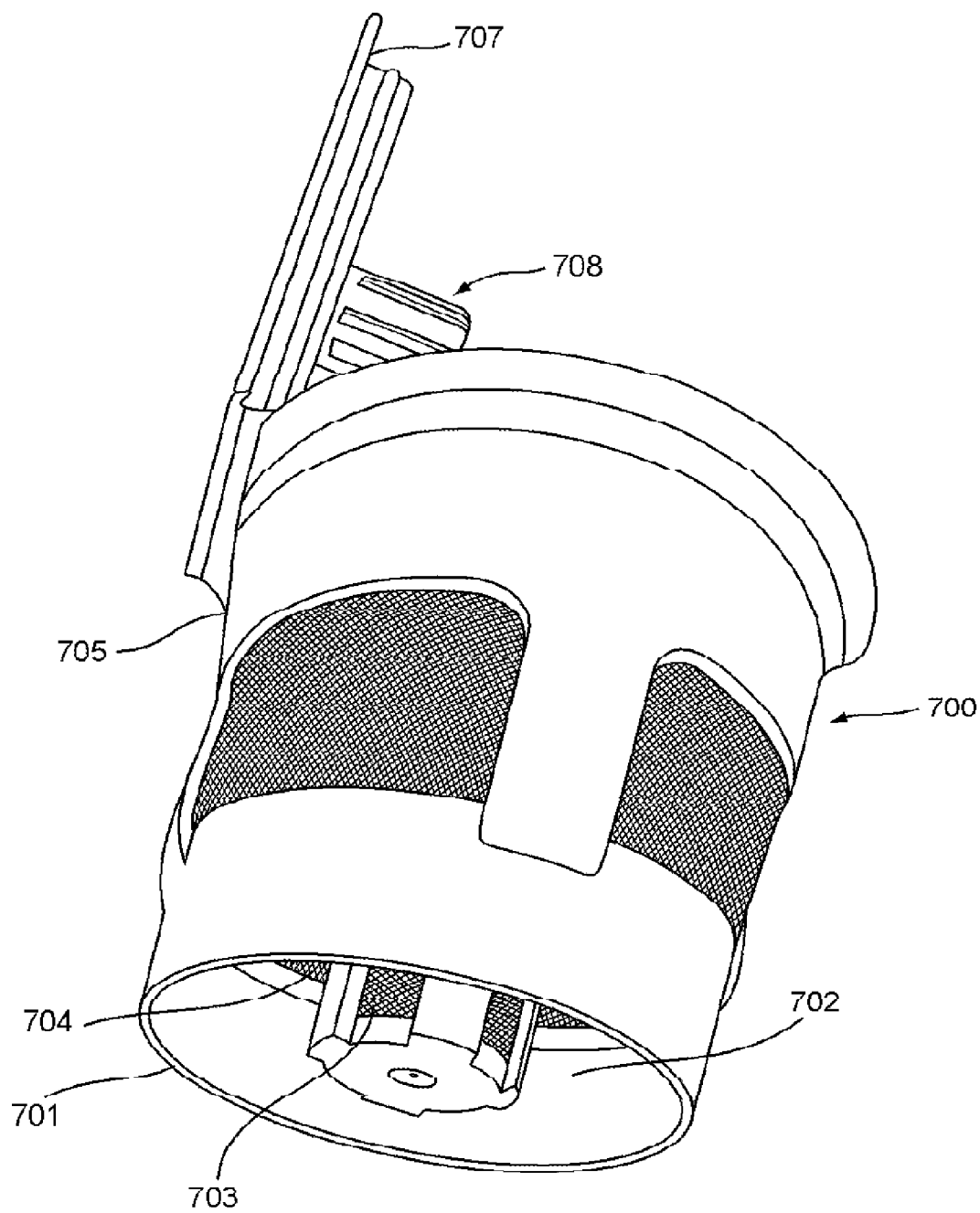
FIG. 23 is an illustration of another embodiment of the invention.
Figure 24:
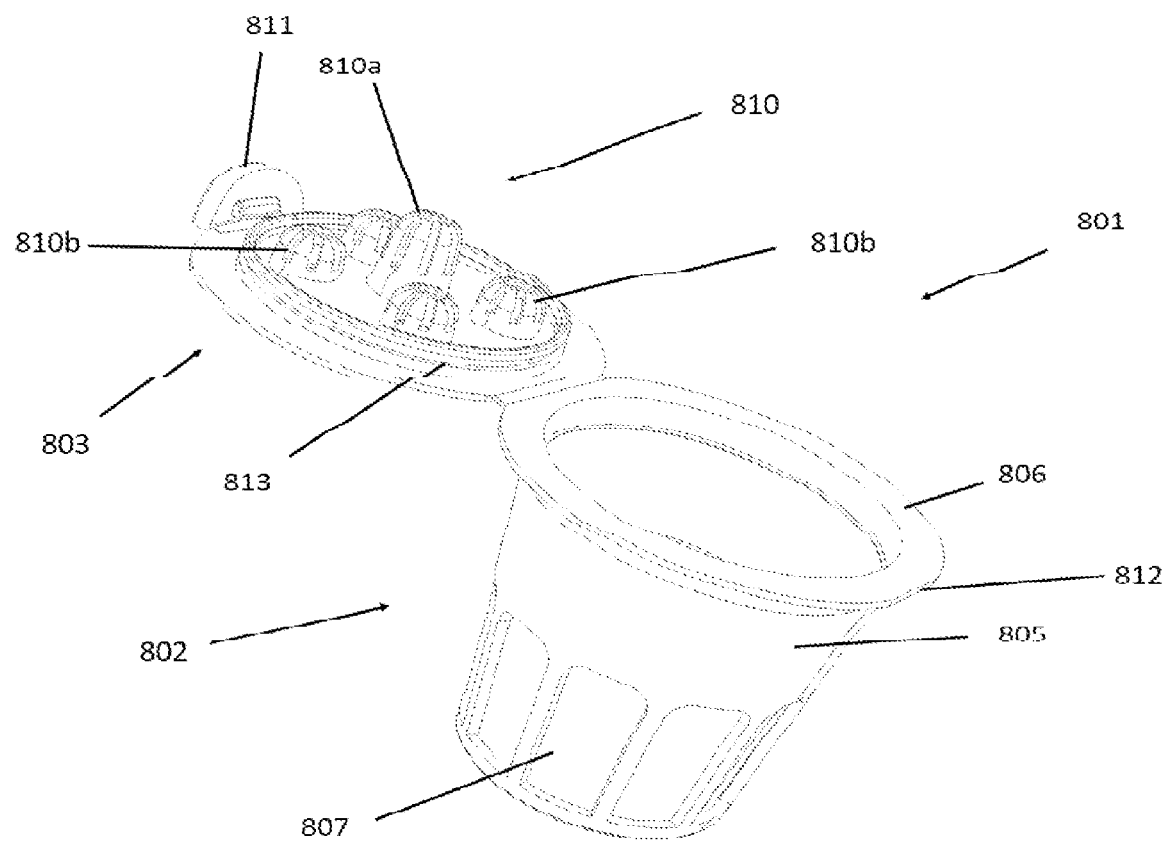
FIG. 24 is an isometric top view of an exemplary beverage brewing container according to the invention.
Figure 25:
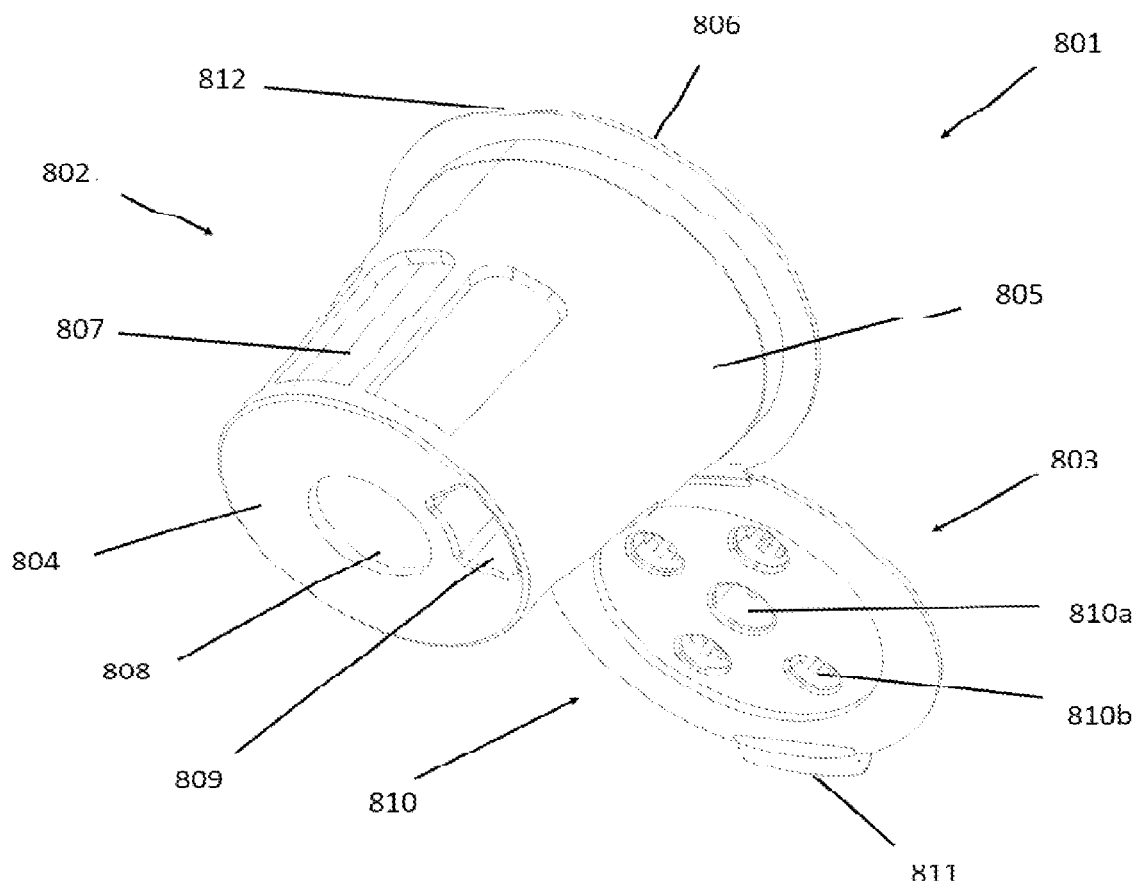
FIG. 25 is an isometric bottom view of an exemplary beverage brewing container according to the invention.
Figure 26:
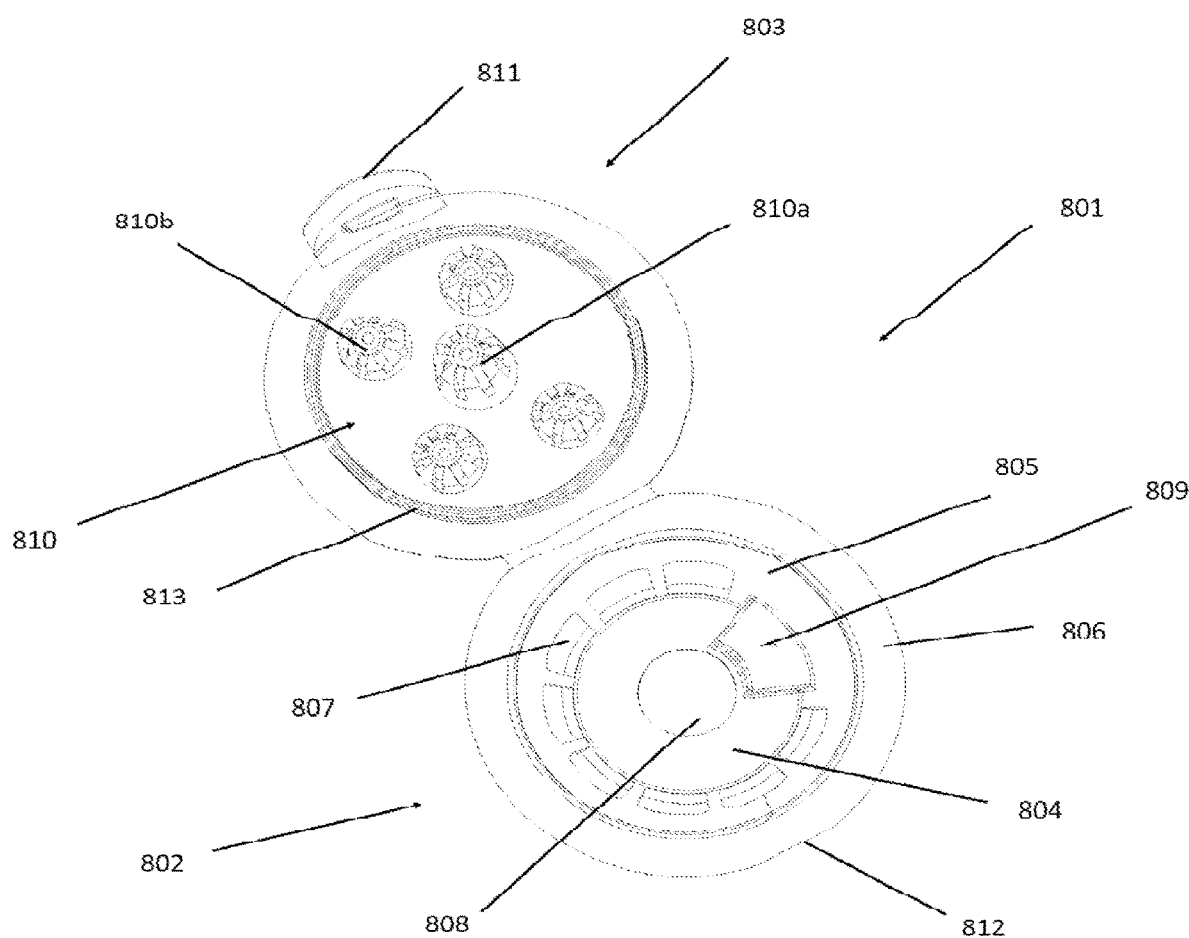
FIG. 26 is a top view of an exemplary beverage brewing container according to the invention.
Figure 27:
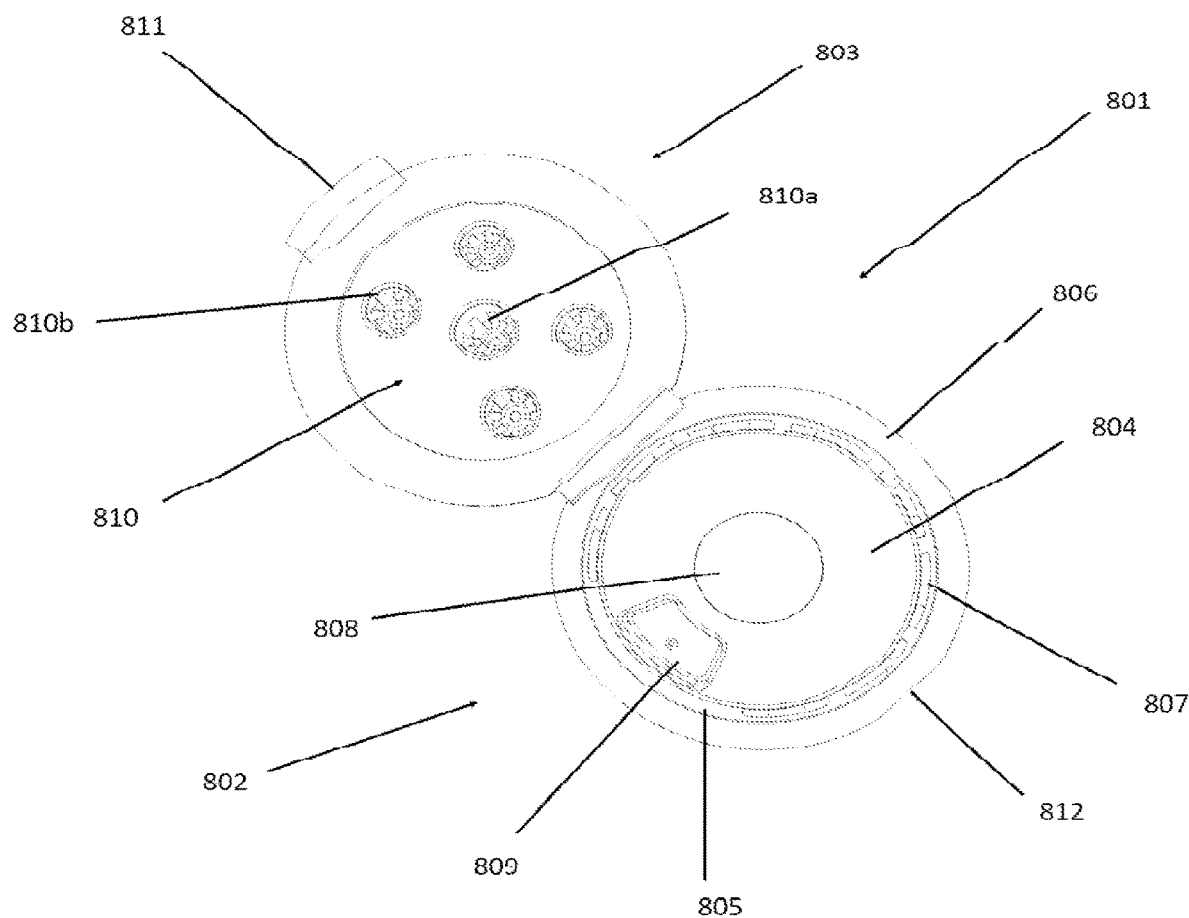
FIG. 27 is a bottom view of an exemplary beverage brewing container according to the invention.
Figure 28:
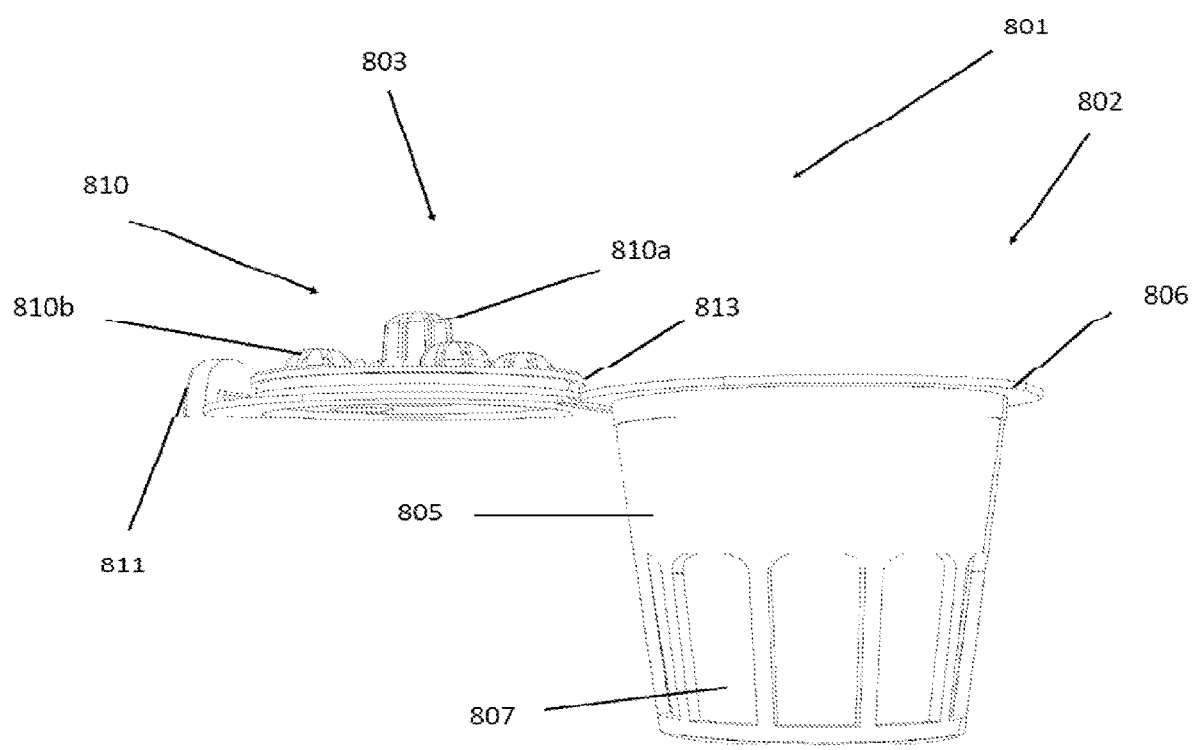
FIG. 28 is a side view of an exemplary beverage brewing container according to the invention.
Figure 29:
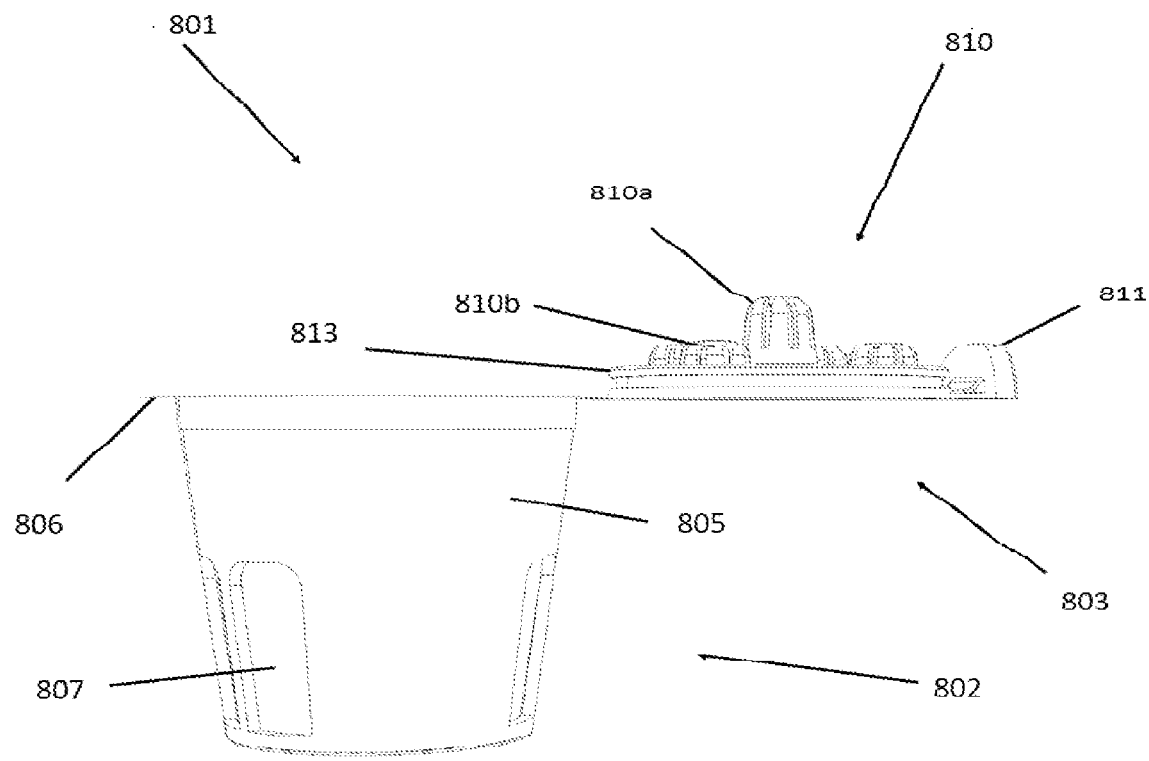
FIG. 29 is a side view of an exemplary beverage brewing container according to the invention.
Figure 30:
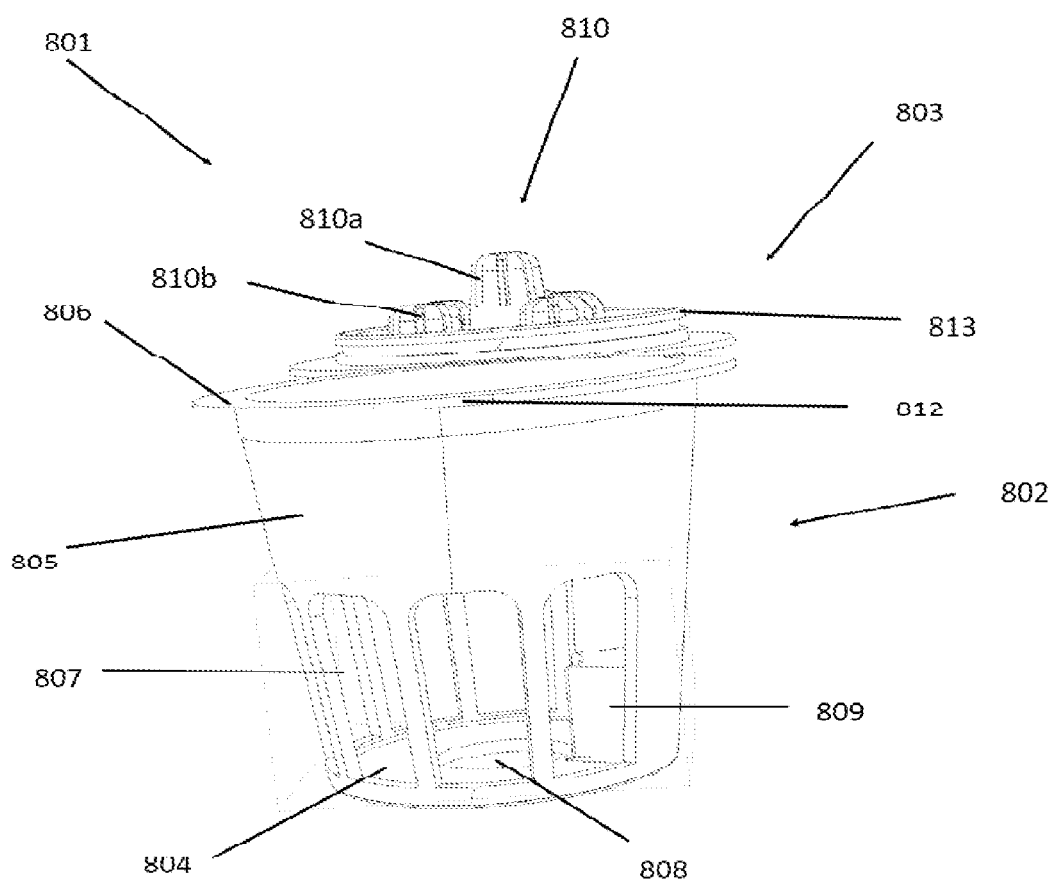
FIG. 30 is an isometric view of an exemplary beverage brewing container according to the invention.
Figure 31:
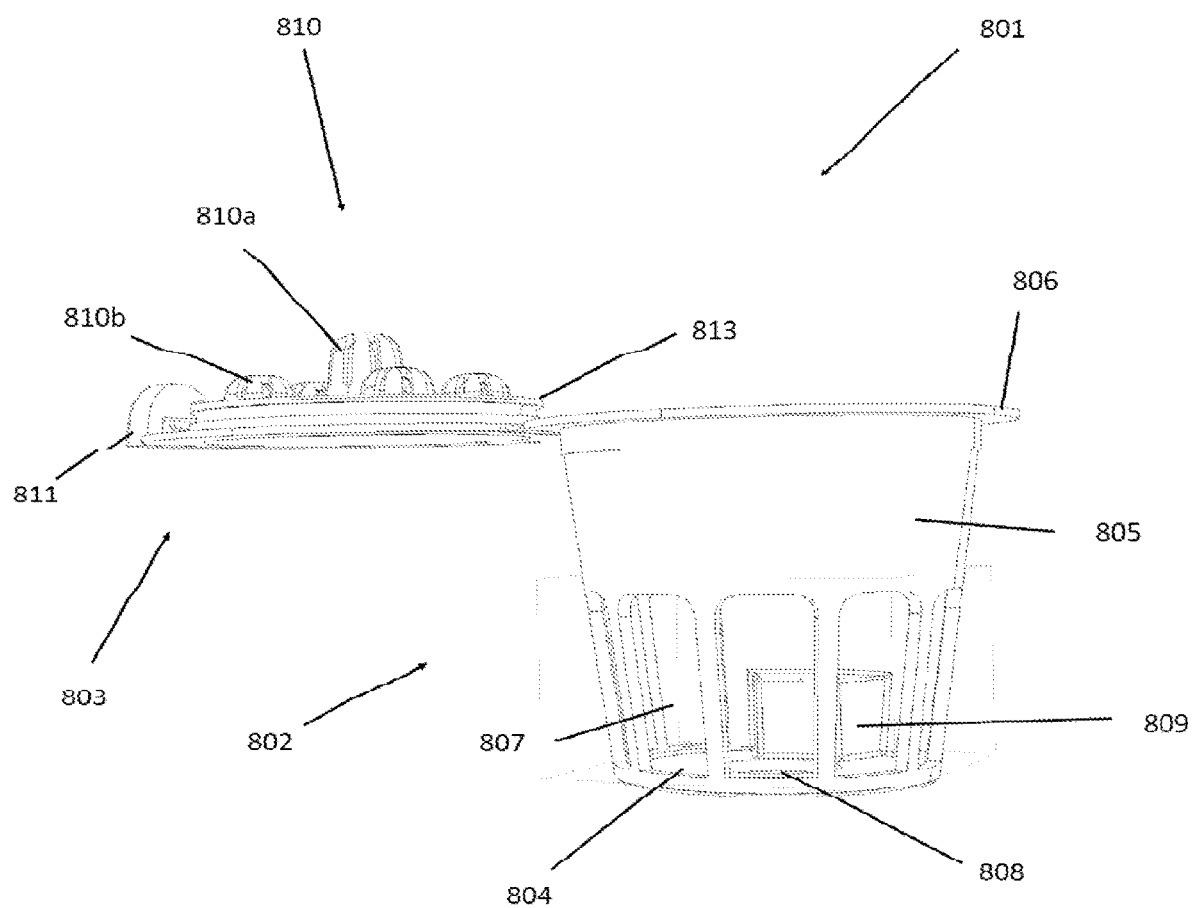
FIG. 31 is a side view of an exemplary beverage brewing container according to the invention.
Figure 32:
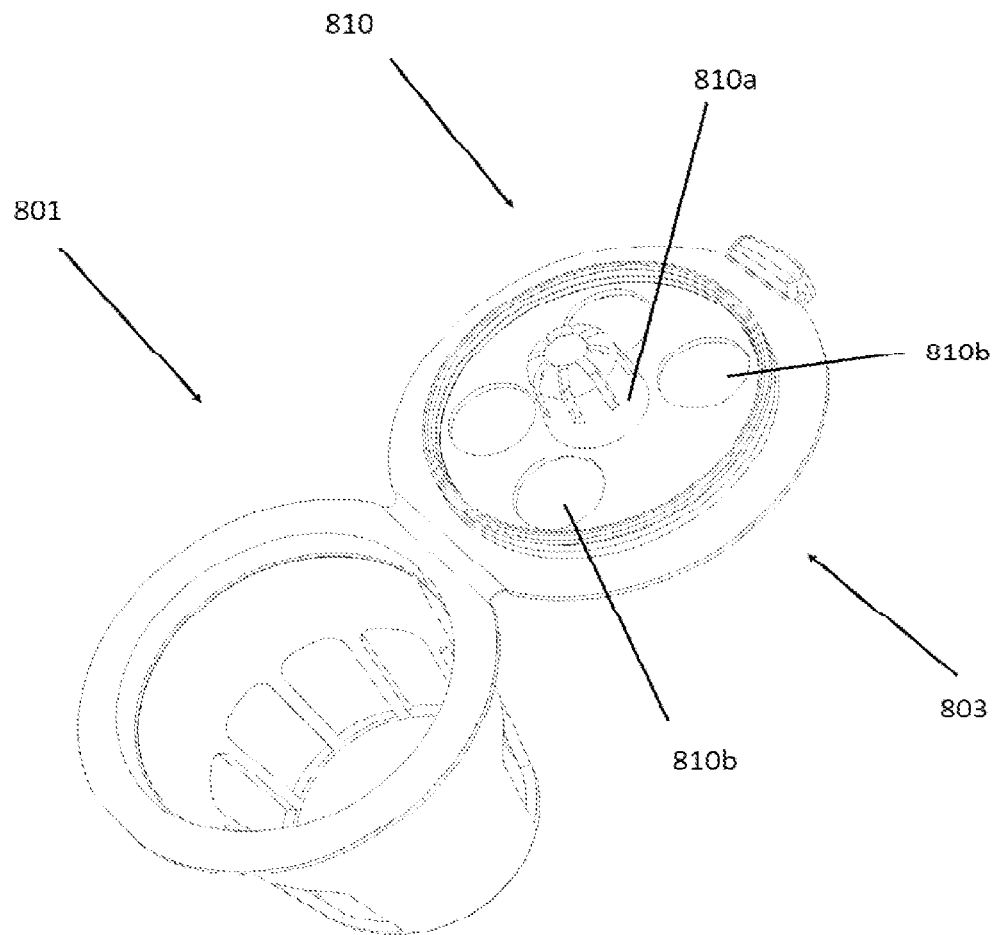
FIG. 32 is an isometric view of an exemplary beverage brewing container according to the invention.

As shown in FIG. 23, the receptacle 700 can also include an extension 701 extending from the exterior surface of the base such that at least a portion of the base is raised a predetermined distance above the brewing chamber when the lower end of the extension 701 is in contact with the brewing chamber. As shown, the extension 701 can extend from a periphery of the base. Alternatively, or in addition, an extension 702 can extend from an interior portion of the base. In the latter case, the extension can include one or more apertures 703 at least partially covered by a screen material. This would allow loose grounds to be placed directly in the receptacle 700 for brewing, without the need for a pod or water-permeable pouch. The apertured extension 702 can be included as the passageway described above, or can be included in addition to the passageway, to provide an additional avenue for beverage outflow. With or without the extension, the passageway likewise can include a screen 704, to allow for brewing of loose grounds.

In addition to or in place of the inner extension 702 and/or the passageway 704, at least one portion of the sidewall 705 can include an aperture 706 that is at least partially covered by a screen material. This would allow for outflow from the receptacle 700 for a beverage brewed from loose grounds.

The cover 707 can include a perforated bay 708 extending into the receptacle from the opening of the cover. The inflow fluid received through the bay 708 is dispersed onto the grounds in a manner that would depend in part on the character of the perforations in the bay 708. For example, the perforations shown in FIG. 23 are thin apertures arranged in a longitudinal direction with respect to the length of the bay 708. However, it is contemplated that circumferential apertures, round holes, or any other manner of perforation can be advantageously used.

With reference to FIGS. 24-32, an exemplary beverage brewing container 801 according to the invention is configured to be disposed within a brewing chamber of a beverage brewer and to hold brewing material while brewed by the beverage brewer. The container 801 includes a receptacle 802 configured to receive the brewing material, and a lid 803. The receptacle 802 includes a base 804, and at least one sidewall 805 extending from the base and terminating in an open end preferably having a rim 806.

The receptacle 802 is configured to hold beverage brewing material during the brewing process in order to brew a beverage. In order to provide fluid communication from an interior of the receptacle 802 to an exterior of the receptacle 802 (such as into a brewing chamber or directly into a serving or drinking container), either the sidewall 805 or the base 804 or both can have openings to allow brewed beverage to pass out of the receptacle 802. These openings can be covered in a mesh, screen, or other liquid-permeable material configured to retain the brewing material while allowing liquid to pass through. For example, the sidewall 805 can include one or more sidewall openings 807, and/or the base 804 can include one or more base openings 808. The base 804 and/or sidewall 805 can also include a recessed enclosure 809 that is configured to accommodate and isolate an outflow nozzle or needle of the brewing machine, preventing outflow from the receptacle 802 through the outflow needle, which is kept outside of the receptacle 802. Of course, instead of the recessed enclosure 809, any accommodation for the outflow nozzle or needle of the brewing machine, such as those described above, can be provided instead.

The lid 803 is configured to engage with the rim 806 to close off the open end of the sidewall 805. The lid 803 includes one or more openings 810 that are configured to accommodate the injection nozzle(s) or needle(s) providing water to the receptacle 802. These openings 810 can be simple through-holes, or can include apertured, for example slotted, dispersion bays as shown, configured to disperse the received water, or can have any other configuration that accommodates the injection nozzles and provides the water to the interior of the receptacle 802. The lid 802 can be hingedly attached to the receptacle 802 as shown in the exemplary embodiment, or can be attached in some other manner, or can be completely detachable as a separate element.

Five such openings are shown in the exemplary embodiment, but the openings 810 can be provided in any number, so as to be suitable for use with brewing machines having any number of injection nozzles. Also, the openings 810 can have uniform configurations, or can be configured differently to accommodate different configurations of injection nozzles or to provide different dispersion profiles into the beverage brewing material, for example by having bays that have different sizes, different shapes, and/or different aperture configurations. For example, the exemplary embodiment shown includes a larger opening 810a and four smaller openings 810b, configured as dispersion bays (or as simple through-holes in FIG. 32). In this configuration, one opening 810a is larger and includes a larger bay and therefore can accommodate a larger main injection nozzle, and the other openings 810b can accommodate smaller injection nozzles. One or more of the openings or bays can be provided that are wide enough to accommodate more than one injection nozzle if desired, or a single opening or bay can be provided that is wide enough to accommodate all of the injection nozzles. Alternatively, an entire portion of the lid can be recessed to accommodate multiple injection nozzles, or all of the injection nozzles, and the recess can include one or more openings or bays arranged so as to control the dispersion of water onto the brewing material regardless of the geometrical arrangement of the injection nozzles.

It would be beneficial for the lid 803 to be able to accommodate beverage brewers having a single injection nozzle/needle or any multiple number of injection nozzles/needles, so that the beverage brewing container 801 can be used with any brewer, regardless of design. In this case, the lid 803 can include multiple openings 810, and the beverage brewing container 801 can be used with brewers having a single injection nozzle/needle, or multiple injection nozzles/needles, and one or more of the openings 810 can be unused during brewing if the openings 810 outnumber the injection nozzles/needles. However, during the brewing process, hot water is often injected at high pressure, so that there is a possibility that some of the water could splash out of the beverage brewing container 801 through any unused openings 810, creating a potential for making a mess or even injury from contact with hot water.

To avoid this possibility, the beverage brewing container 801 can include plugs that can be removably inserted into any unused openings 810 during the brewing process, effectively preventing spillage through the unused openings 810. Such plugs should be formed of a resilient, heat-resistant material, such as silicone. The plugs can be inserted into individual unused openings 810 as needed, and can include nubs on the top and/or side for grasping to facilitate removal from the openings 810 after use. One or more of these plugs can be tethered to the lid 803, such as to the face or edge of the lid 803, to prevent misplacing the plugs. Alternatively, a number of plugs can be tethered together. For example, a ring of plugs can be provided in any number desired, individual plugs of which can be inserted into selected unused openings 810. If the ring is also formed of a flexible material such as silicone, the ring of plugs can be used regardless of the geometric configuration of unused openings 810, and any unneeded, unused plugs will remain tethered to the ring during the brewing process. The ring of plugs can be provided separately from the lid 803, or the ring can be tethered to the lid. Thus, the plugs, whether provided individually or as part of a ring, allow for flexibility in use of the beverage brewing container 801, so that a beverage brewing container 801 with a lid 803 having multiple openings 810 can be used with beverage brewers having any number of nozzles/needles without the potential for splashing outside the beverage brewing container 801.

Further, instead of being simple plugs, the plugs can be one-way valves that provide an opening for nozzles/needles pushed in from outside the lid 803, but prohibit fluid flow from the interior of the beverage brewing container 801 out through the lid 803. In this case, the plugs can remain in place and need not be removed when switching beverage brewers. Alternatively, the lid 803 can be formed with one or more such one-way valves arranged in the lid 803 itself, either as inserted elements or integrally formed with the rest of the lid 803. In any case, the valves can be active components or can be simple structures that can perform a valve function, such as a slit or cross-cut in a piece of silicone that yields to the pressure of a solid nozzle/needle to create an opening but which closes tightly enough in the absence of the nozzle/needle to provide a fluid-tight seal. If the lid 803 or an interior of the lid 803 is formed of silicone or of a similar material, such slits or cross-cuts can be provided in the lid surface to act as valve openings. Alternatively, a lid 803 having conventional openings 810 can be provided with a removable silicone mat or plate that includes slits, cross-cuts, or other valve structures arranged to correspond with the openings 810 to provide the flexible valve functionality.

Figure 33:
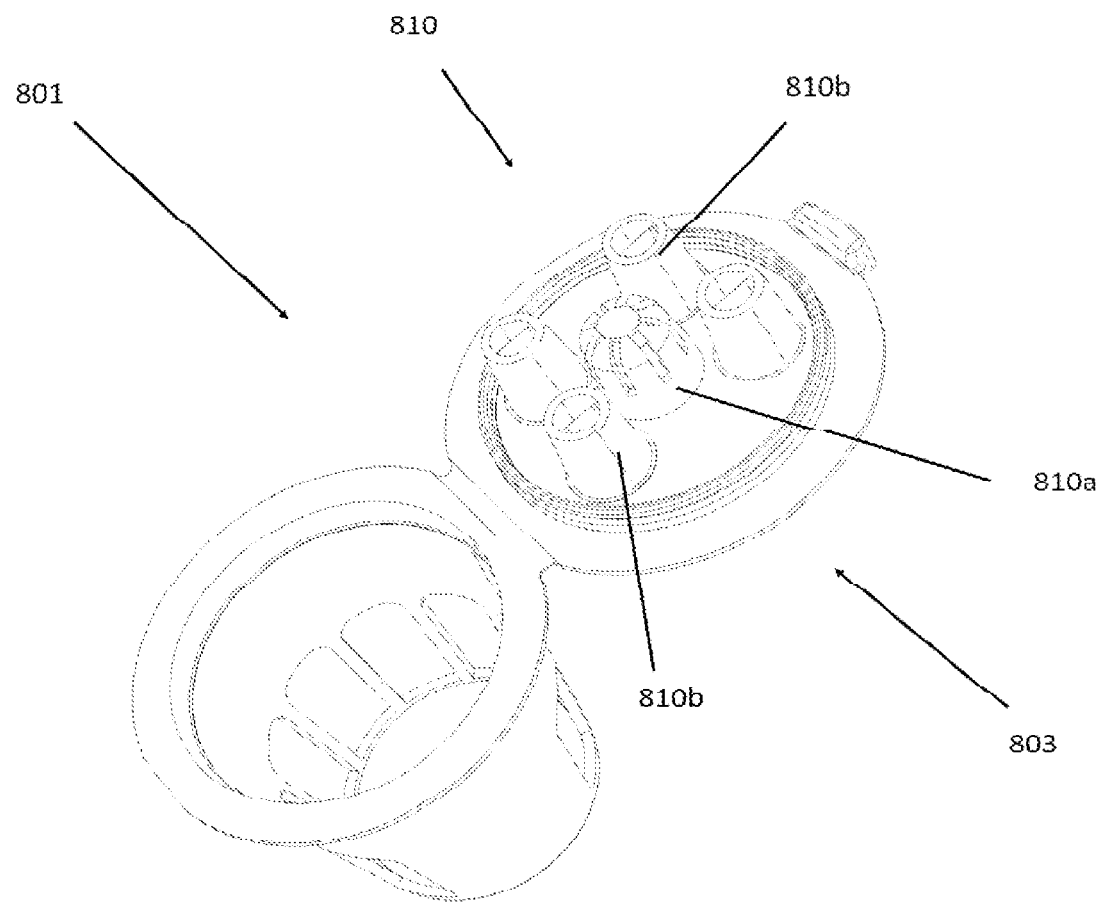
FIG. 33 is an isometric view of an exemplary beverage brewing container according to the invention.
Figure 34:
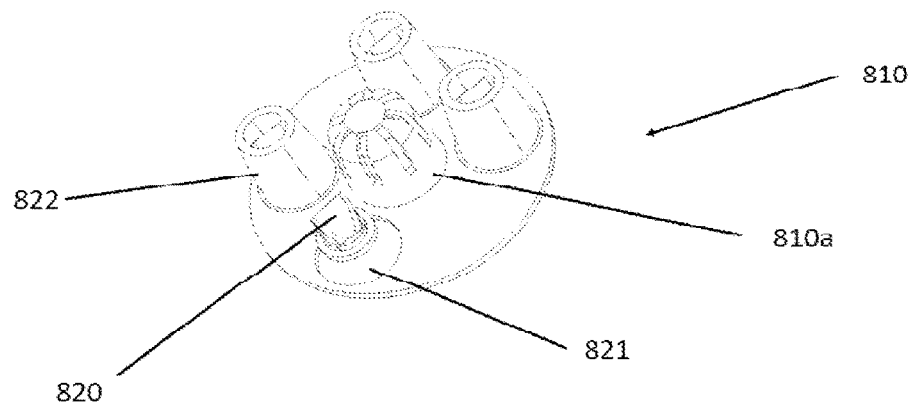
FIG. 34 is an isometric view of an exemplary duckbill valve assembly according to the invention.
Figure 35:
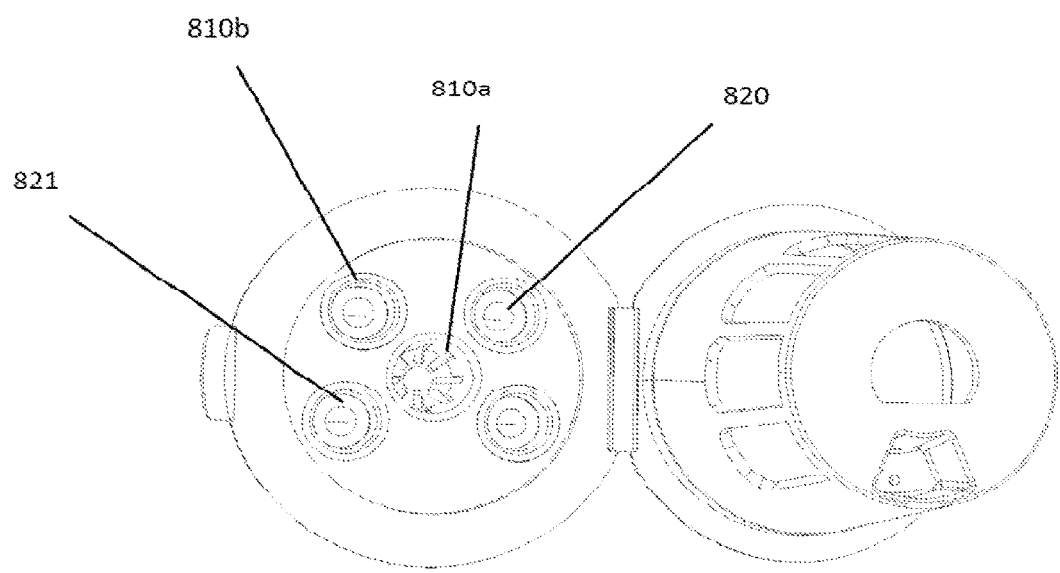
FIG. 35 is an isometric view of an exemplary beverage brewing container according to the invention.
Figure 36:
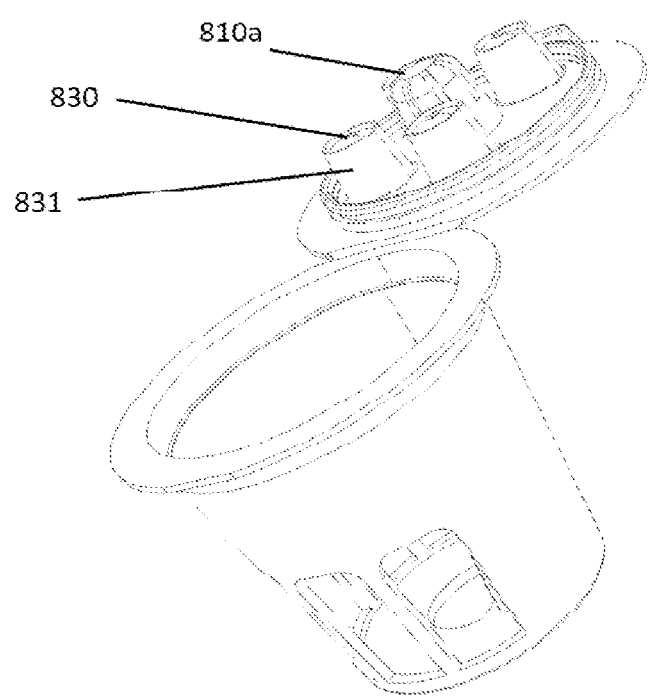
FIG. 36 is an isometric view of an exemplary beverage brewing container according to the invention.
Figure 37:
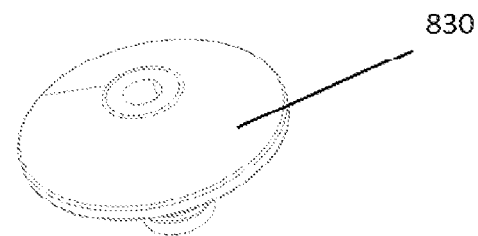
FIG. 37 is an isometric view of an exemplary umbrella valve according to the invention.
Figure 38:
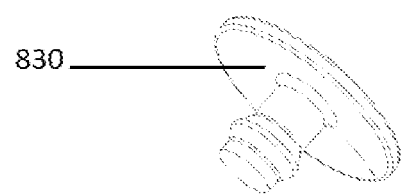
FIG. 38 is an isometric view of an exemplary umbrella valve according to the invention.
Figure 39:
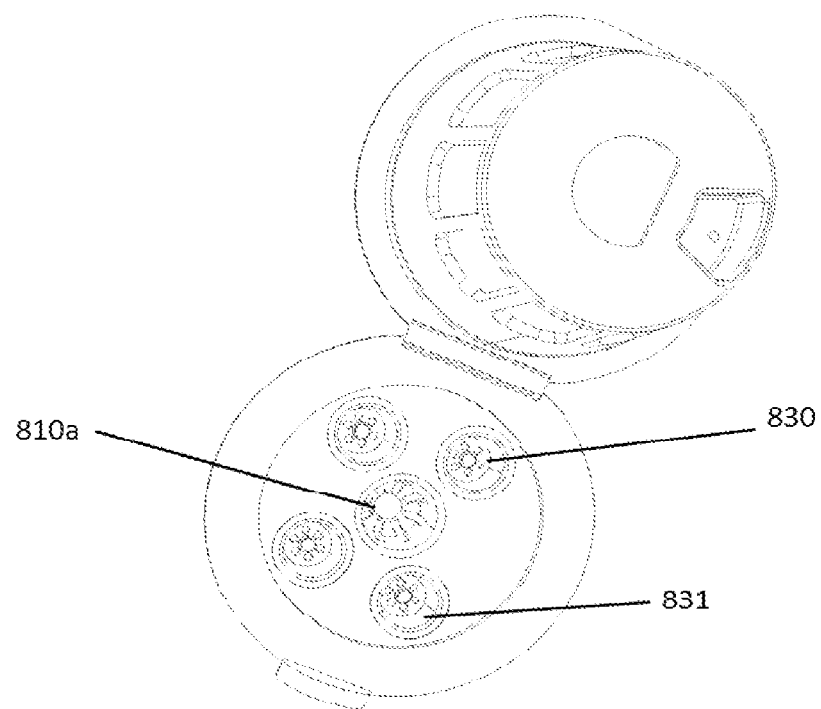
FIG. 39 is an isometric view of an exemplary beverage brewing container according to the invention.

For example, FIGS. 33-35 show a central opening 810a having a slotted dispersal bay, and several distributed openings 810b having one-way valves, in this case duckbill valves. Duckbill valves are typically elastomeric elements formed as lips or flaps in the shape of a duckbill that act as backflow prevention devices or one-way valves. Preferably, the duckbill valves are made of a food-grade silicone material, and can be inserted into openings in the lid or formed integrally with the lid. In the exemplary embodiment shown, the duckbill valve assembly includes the valve 820 arranged in the opening 810b, secured by a sealing element 821 and shielded by a valve enclosure 822. Firm pressure on the valve 820 by an injection nozzle/needle opens the valve 820, which is otherwise closed to prevent backflow when no nozzle/needle is present.

FIGS. 36-39 show another exemplary embodiment in which a central opening 810a has a slotted dispersal bay, and several distributed openings 810b have one-way valves, in this case umbrella valves. Umbrella valves are typically elastomeric elements having a diaphragm-like sealing disk that can be curved to resemble an umbrella, which act as backflow prevention devices or one-way valves. As shown, the valves 830 are mounted in a seat 831 such that the convex diaphragm flattens out against the valve seat 831 and creates a sealing force. The umbrella valve 830 allows forward flow once the head pressure creates enough force to lift the convex diaphragm from the seat and allow flow at a predetermined pressure into the beverage brewing container while preventing backflow out of the beverage brewing container. Thus, the umbrella valve 830 uses its elastic material properties and its pre-loaded convex shape to create the sealing force against the seat 831 and the bulge in the central stem of the valve 830 holds the valve 830 in place. Alternatively, a spring or a central or circumferential disc positioner can be used. Like the duckbill valves, the umbrella valves are preferably made of a food-grade silicone material, and the seats 831 be inserted into openings in the lid or formed integrally with the lid.

The duckbill valves and umbrella valves shown are only two examples of one-way or backflow valves that are contemplated for use as valve elements for the openings 810. Any type of suitable valve, such as duckbill-umbrella combination valves, flapper valves, Belleville valves, x-fragm valves, mini valve balls, cross-slit valves, dome valves, spring-loaded disc valves, bearing valves, choke valves, pinch valves, piston valves, butterfly valves, or any other type of backflow valve can be used, and is contemplated for use as an element of the invention.

Alternatively, as shown in FIGS. 40-46, instead of valves the mat 814 can include plugs 815 that can be inserted into the conventional openings 810 from the top or the bottom. In the example shown in the drawings, the plugs 815 are inserted from the bottom (facing the inside of the receptacle 802), but can be inserted from the top (outside) instead. The mat 814 can include as many plugs 815 as necessary or desired, and openings and/or dispersal bays 816 through which water is intended to flow into the ground beverage material in the receptacle 802. The dispersal bays 816 can be molded into the mat 814 or can be formed separately and attached to the mat 814. For example, in the embodiment shown in the drawings, the plugs 815 are formed integrally with the mat 814, and the dispersal bay 816 is attached to the mat 814, for example, by a snap fit. This arrangement allows for the use of dispersal bays having, for example, different sizes, with the same mat 814. It also allows the mat 814 and plugs 815 to be formed from a different material than the dispersal bay 816. For example, in certain applications it could be beneficial to form the mat 814 and plugs 815 from a resilient material such as silicone, to allow a conformal fit of the plugs 815 in the conventional openings 810, and the dispersal bay 816 from a more rigid plastic or even metal.

Figure 40:
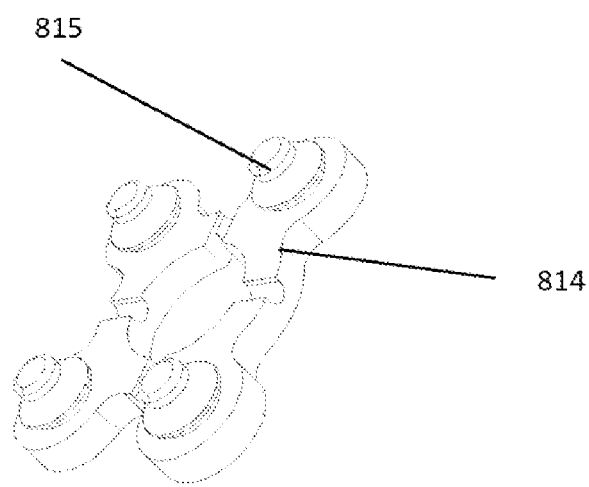
FIG. 40 is an isometric view of an exemplary mat with plugs.
Figure 41:
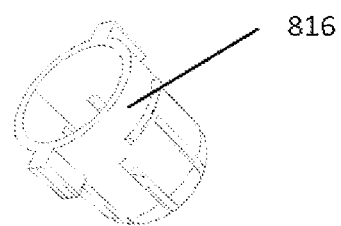
FIG. 41 is an isometric view of an exemplary dispersal bay configured to be coupled to the mat.
Figure 42:
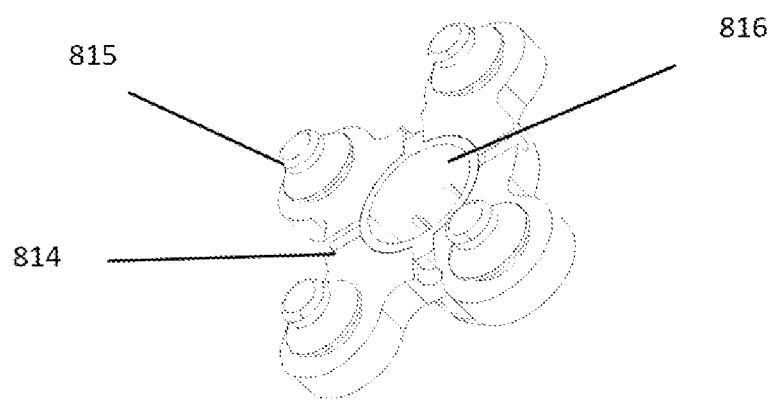
FIG. 42 is an isometric view of an exemplary mat with plugs and a dispersal bay.
Figure 43:
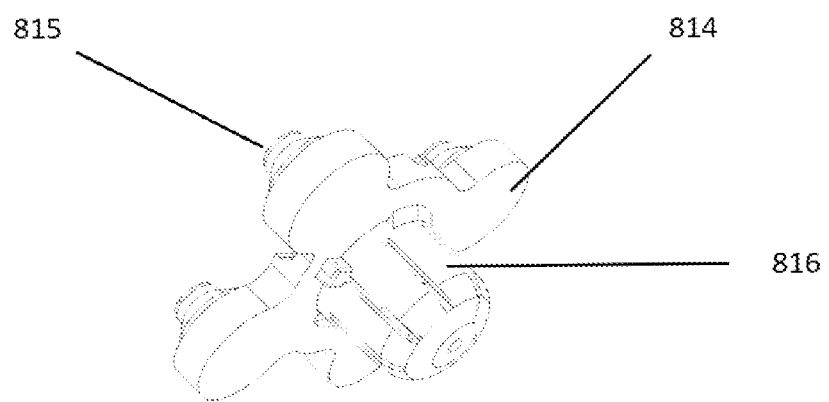
FIG. 43 is an isometric view of an exemplary mat with plugs and a dispersal bay.
Figure 44:
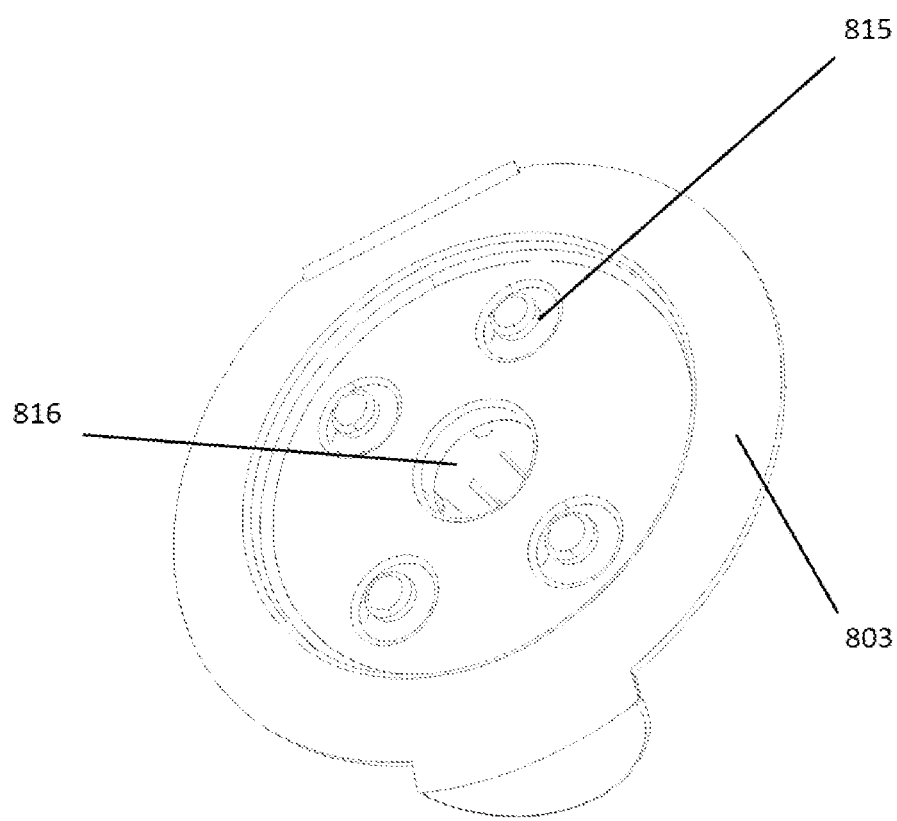
FIG. 44 is an isometric view of an exemplary lid coupled to a mat with plugs and a dispersal bay.
Figure 45:
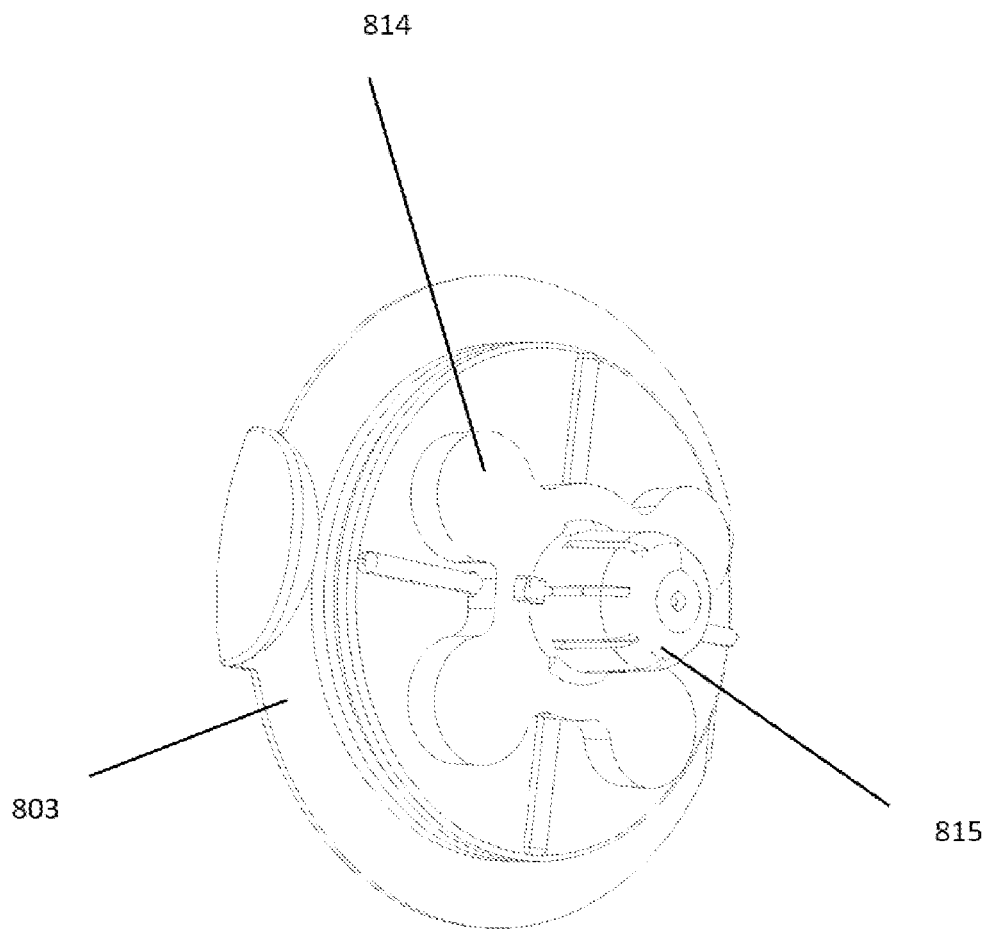
FIG. 45 is an isometric view of an exemplary lid coupled to a mat with plugs and a dispersal bay.
Figure 46:
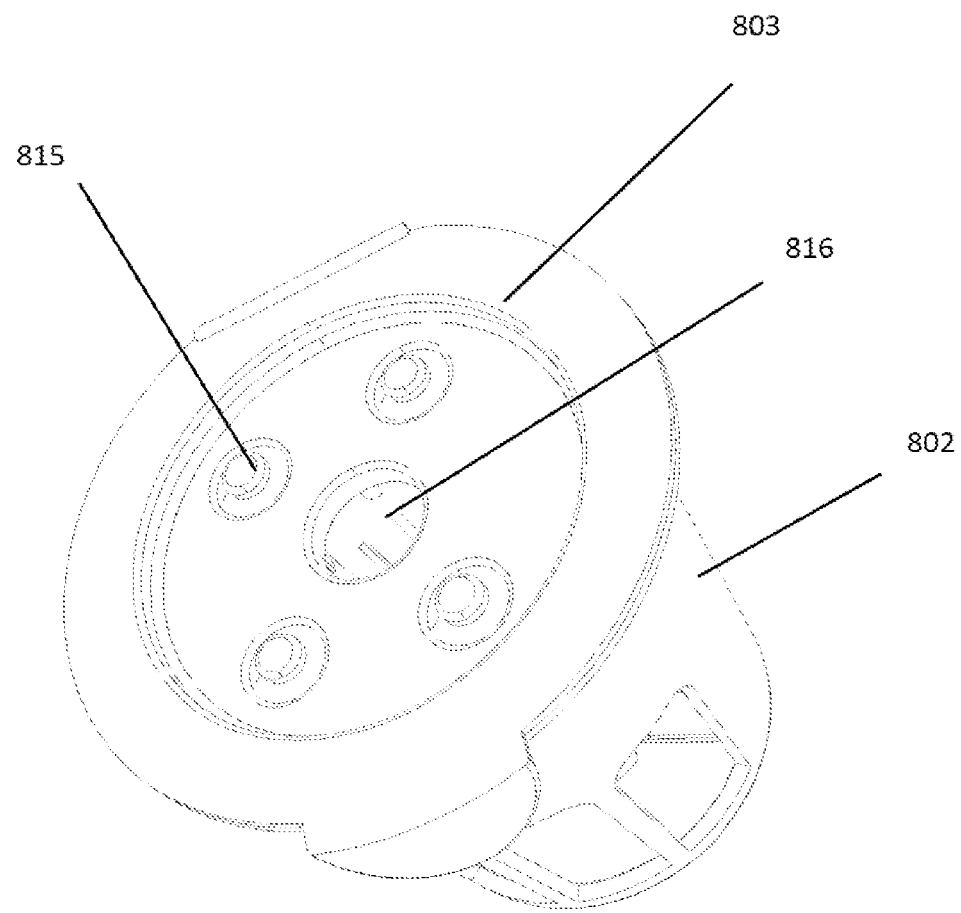
FIG. 46 is an isometric view of an exemplary receptacle with a lid coupled to a mat with plugs and a dispersal bay.

According to a particular exemplary embodiment, FIGS. 40 and 41 show the mat 814 with several plugs 815 configured to block unused conventional openings 810, and a dispersal bay 816 attached or configured to be removably coupled to the mat 814, respectively. As shown, the mat 814 and dispersal bay 816 have mating cooperating elements configured to provide secure attachment and, optionally, keying for precise positioning. FIGS. 42 and 43 show different views of the exemplary mat 814 and dispersal bay 816 in a coupled configuration; FIGS. 44 and 45 views of the mat 814 assembly coupled to the lid 803; and FIG. 46 with the lid 803 coupled to the receptacle 802. As shown, the lid 803 and the mat 814 can be mutually keyed for precise engagement.

Figure 47:
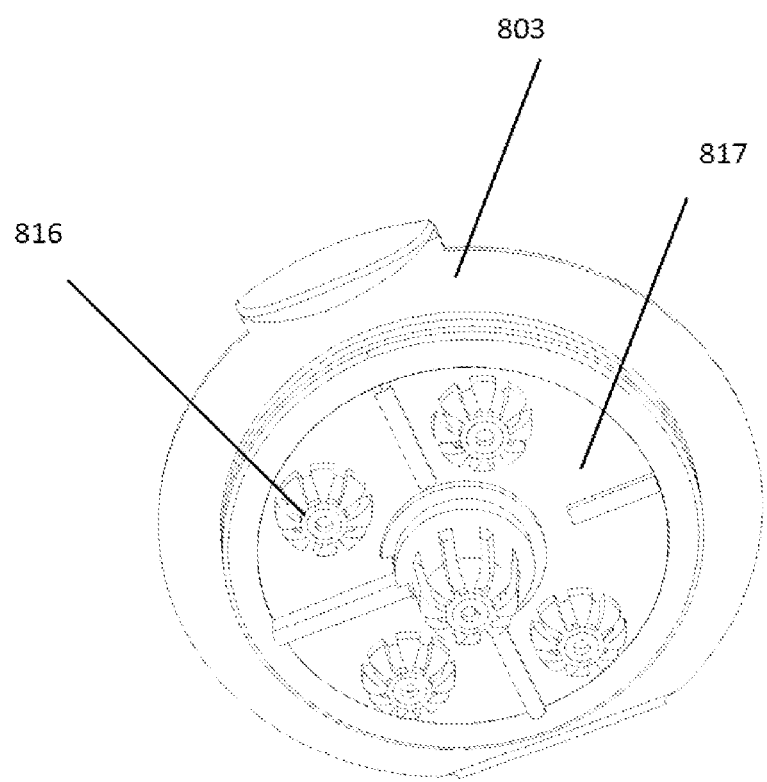
FIG. 47 is an isometric view of an exemplary lid with dispersal bays on a rotating disk.
Figure 48:
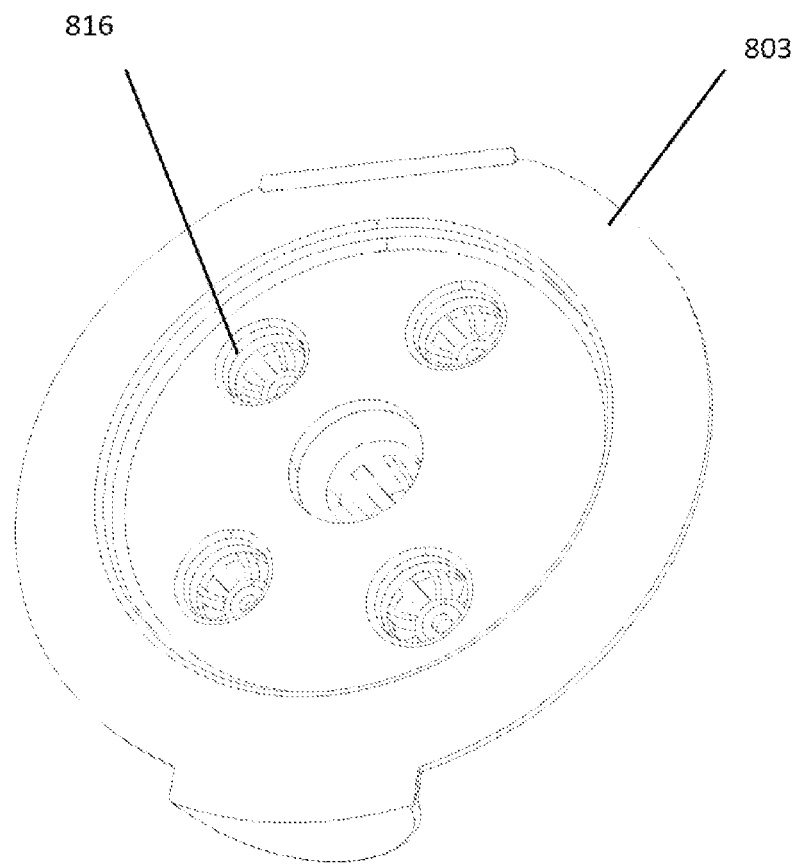
FIG. 48 is an isometric view of an exemplary lid with dispersal bays on a rotating disk.

Another exemplary embodiment is shown in FIGS. 47 and 48, in which the lid 803 is fitted with a disk 817, on which one or more dispersal bays 816 are arranged. The disk 817 is coupled to the lid 803 such that the disk 817 is rotatable in the plane of the lid 803 to selectively cover conventional openings 810 in the lid 803 and/or line up conventional openings 810 in the lid 803 with one or more dispersal bays 816 on the disk to allow water flow through selected dispersal bays 816 and prevent water flow through conventional openings 810 covered by the disk 817. As shown in the exemplary embodiment, the disk 817 can include a central dispersal bay that is always aligned with a central conventional openings 810 in the lid 803, but a central dispersal bay is not necessary. Alternatively, the central dispersal bay can be part of the lid 803, and the disk 817 can have a central hole through which the central dispersal bay is inserted when the disk 817 is coupled to the lid 803. The disk 817 can be ratcheted or otherwise indexed so that the disk 817 can be clicked through various discrete rotational positions around the lid 803 and held securely in place in a selected position.

For added flexibility, multiple lids 803 can be provided, each having different numbers and/or arrangements of openings 810. Thus, the particular lid 803 used for brewing can be selected based on the brewer to be used, to have openings 810 compatible with the brewer. Of course, in this case, the lids 803 would not be attached to the brewing container 801, and would be provided loose, to be coupled when actually used to brew a beverage.

To be sure that the beverage brewing container 801 aligns with the nozzle/needle pattern properly, the receptacle 802 and/or the lid 803 can be keyed to correspond to the brewing chamber or other element of the brewer, so that alignment of the keying elements corresponds to alignment of the nozzles/needles with the openings 810. For example, elements of the beverage brewing container 801 and/or brewer can be notched and/or can include corresponding ears to ensure proper rotational orientation of the beverage brewing container 801 in the brewing chamber when arranged for the brewing process, so that the openings 810, with or without plugs or valves, align properly with the nozzles/needles. Proper placement of the recessed enclosure 809 can function as keying for this alignment, but if another accommodation for the outflow nozzle/needle is provided, or if multiple recessed enclosures 809 are provided, the alternative keying elements can ensure proper alignment.

Thus, the container 801 is configured to accept input fluid through the opening(s) 810 and to provide a corresponding outflow of fluid through the sidewall opening(s) 807 and/or base opening(s) 808, while avoiding a lower needle of the beverage brewer.

The lid 803 can also include a closure element 811, for example configured to latch at a contour 812 in the rim 806, in order to secure the lid during the brewing process. The lid 803 can also include a seal 813 configured to engage the rim in a fluid-tight manner.

In use, beverage brewing material can be placed in the receptacle 802, the lid 803 can be closed over the open end of the receptacle 802 onto the rim 806, and the container 801 can be placed into the chamber of a beverage brewer. When the brewer is actuated, injection needles or nozzles will be received by one or more of the lid openings 810 and will inject water into the interior of the receptacle 802, either directly or through dispersion protrusions or bays, where it will wet and soak the beverage brewing material to brew a beverage. The recessed enclosure 809 or other configuration will prevent an outflow of the brewed beverage through the outflow needle or nozzle of the brewer, and the beverage will instead flow out through the base opening(s) 808 and/or sidewall opening(s) 807 and eventually into a drinking or serving container.

The invention has been described by way of example and in terms of preferred embodiments. However, it is to be understood that the invention is not strictly limited to the particularly disclosed embodiments. To the contrary, various modifications, as well as similar arrangements, are included within the spirit and scope of the invention. The scope of the appended claims, therefore, should be accorded the broadest possible interpretation so as to encompass all such modifications and similar arrangements.

I claim:

1. A brewing material container for a beverage brewer, comprising:
    a receptacle configured to receive and hold beverage brewing material and to be placed in a brewing chamber of the beverage brewer; and
    a lid;
    wherein the receptacle includes
        a base, and
        a sidewall extending from the base and terminating in an open top end and a bottom edge;
    wherein the lid is configured to engage with the open top end of the sidewall to at least partially cover the open top end;
    wherein the lid includes a plurality of lid openings configured to receive a corresponding respective plurality of injection nozzles of the beverage brewer;
    wherein at least one of the base and the sidewall includes a receptacle opening configured to allow fluid flow from an interior of the receptacle to an exterior of the receptacle;
    wherein the brewing material container further comprises a selective obstruction configured to selectively block one or more of the lid openings; and
    wherein at least a portion of the base is spaced from the bottom edge of the sidewall to accommodate an outflow nozzle of the beverage brewer.

2. The container of claim 1, wherein the selective obstruction includes a plug configured to be removably coupled to a selected lid opening to prevent fluid communication through the selected lid opening.

3. The container of claim 1, wherein the selective obstruction includes a valve configured to be coupled to a selected lid opening to control fluid communication through the selected lid opening.

4. The container of claim 3, wherein the valve is a duck-bill valve.

5. The container of claim 3, wherein the valve is an umbrella valve.

6. The container of claim 1, wherein the selective obstruction includes a mat configured to be coupled to the lid and to cover one or more selected lid openings to control fluid communication through the one or more selected lid openings.

7. The container of claim 6, wherein the mat includes at least one plug.

8. The container of claim 6, wherein the mat includes at least one valve.

9. The container of claim 8, wherein the at least one valve includes a slit in the mat.

10. The container of claim 1, wherein the selective obstruction includes a rotatable disk configured to be coupled to the lid and to cover one or more selected lid openings to control fluid communication through the one or more selected lid openings.

11. The container of claim 1, wherein at least one of the base and the sidewall includes a recessed enclosure.

12. The container of claim 1, wherein the lid openings are through-holes, and the lid further includes dispersion bays arranged at the through-holes and configured to protrude toward an interior of the receptacle when the lid engages with the open end of the sidewall to at least partially cover the open end.

13. The container of claim 1, wherein the selective obstruction is configured to couple with the lid such that the selective obstruction is arranged in an interior of the receptacle when the lid engages with the open end of the sidewall.

14. The container of claim 1, wherein the selective obstruction is configured to couple with the lid such that the selective obstruction is arranged below the open end of the sidewall when the lid engages with the open end of the sidewall.

15. The container of claim 1, wherein the receptacle opening is a plurality of receptacle openings in at least one of the base and the sidewall.

16. The container of claim 15, further comprising a mesh material arranged to cover at least the plurality of receptacle openings.

17. The container of claim 1, wherein the receptacle opening includes a perforated portion of at least one of the base and the sidewall.

18. A brewing material container for a beverage brewer, comprising:
    holding means for receiving and holding beverage brewing material and for placement in a brewing chamber of the beverage brewer, wherein the holding means includes base means, and sidewall means for extending from the base means and terminating in an open top end and a bottom edge; and
    covering means for engaging with the open top end of the sidewall means and at least partially covering the open top end;
    wherein the covering means includes a plurality of cover receiving means for receiving a corresponding respective plurality of injection nozzles of the beverage brewer;
    wherein at least one of the base means and the sidewall means includes fluid flow means for allowing fluid flow from an interior of the holding means to an exterior of the holding means;
    wherein the brewing material container further comprises selective obstruction means for selectively blocking one or more of the cover receiving means; and
    wherein at least a portion of the base means is spaced from the bottom edge of the sidewall means to accommodate an outflow nozzle of the beverage brewer.

19. The container of claim 18, wherein the cover receiving means include through-holes.

20. The container of claim 19, wherein the cover receiving means further includes dispersion means arranged at the through-holes, for protruding toward an interior of the holding means when the covering means engages with the open end of the sidewall means to at least partially cover the open end.

21. The container of claim 20, wherein the dispersion means include flow control means for allowing fluid to pass through the dispersion means and for directing flow of the fluid toward the interior of the holding means.

22. The container of claim 18, wherein a portion of the sidewall means is recessed inward toward an interior of the holding means.

23. The container of claim 18, wherein the selective obstruction means includes valve means for coupling with a selected cover receiving means for controlling fluid communication through the selected cover receiving means.

24. The container of claim 18, wherein the selective obstruction means includes a mat for coupling with the covering means for covering one or more selected cover receiving means for controlling fluid communication through the one or more selected cover receiving means.

25. The container of claim 24, wherein the mat includes at least one plug.

26. The container of claim 18, wherein the fluid flow means includes a plurality of fluid flow means in at least one of the base means and the sidewall means.

27. The container of claim 26, further comprising screen means for covering at least the plurality of fluid flow means to allow fluid flow from the interior of the holding means to the exterior of the holding means while retaining the beverage brewing material in the interior of the holding means.

28. The container of claim 18, wherein the fluid flow means includes a perforated portion of at least one of the base means and the sidewall means.

* * * * *